(12) United States Patent
Panchaksharaiah et al.

(10) Patent No.: US 12,192,557 B2
(45) Date of Patent: Jan. 7, 2025

(54) METHODS AND SYSTEMS TO INCREASE INTEREST IN AND VIEWERSHIP OF CONTENT BEFORE, DURING AND AFTER A LIVE EVENT

(71) Applicant: Adeia Guides, Inc., San Jose, CA (US)

(72) Inventors: Vishwas Sharadanagar Panchaksharaiah, Karnataka (IN); Harshith Kumar Gejjegondanahally Sreekanth, Karnataka (IN); Anjum Makkar, Punjab (IN); Pawan Nagdeve, Karnataka (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 44 days.

(21) Appl. No.: 17/696,705

(22) Filed: Mar. 16, 2022

(65) Prior Publication Data
US 2023/0300396 A1 Sep. 21, 2023

(51) Int. Cl.
*H04N 21/2668* (2011.01)
*H04N 21/2187* (2011.01)
(Continued)

(52) U.S. Cl.
CPC ..... *H04N 21/2668* (2013.01); *H04N 21/2187* (2013.01); *H04N 21/2393* (2013.01);
(Continued)

(58) Field of Classification Search
CPC ........... H04N 21/2668; H04N 21/2187; H04N 21/2393; H04N 21/2407; H04N 21/25891;
(Continued)

(56) References Cited

U.S. PATENT DOCUMENTS 6,080,063 A 6/2000 Khosla
6,920,428 B2 7/2005 Greene
(Continued)

FOREIGN PATENT DOCUMENTS

EP 965227 A1 12/1999
EP 965227 B1 2/2002
(Continued)

OTHER PUBLICATIONS

Pantos, Roger, and William May, "HTTP live streaming, RFC 8216." IETF (2017). 60 pages.

*Primary Examiner* — Chenea Davis
(74) *Attorney, Agent, or Firm* — Haley Guiliano LLP

(57) ABSTRACT

Methods and systems generate improved viewership of and interest in content including live events, sporting events, and reality shows utilizing improved content delivery (including streaming content delivery, primary content delivery, and secondary content delivery), analysis of media content items, user interaction, automatic control without user interaction, display configurations, user interfaces, selectable options, live and non-live content, temporal considerations, determinations, predictions, likelihoods, measurements of user interestedness, measurements of relatedness, content availability, user-generated content, identification and delivery of content of particular interest to a user, metadata analysis, playlist generation, and concurrent live content availability. Based on these improvements, dynamic streaming content feeds are generated, which are specifically adapted to the determined interests of a user or a clustered group of users in order to increase viewership of and interest in content. Related apparatuses, devices, techniques, and articles are also described.

21 Claims, 17 Drawing Sheets

(51) Int. Cl.
*H04N 21/239* (2011.01)
*H04N 21/24* (2011.01)
*H04N 21/258* (2011.01)
*H04N 21/431* (2011.01)
*H04N 21/472* (2011.01)
*H04N 21/81* (2011.01)

(52) U.S. Cl.
CPC ... *H04N 21/2407* (2013.01); *H04N 21/25891* (2013.01); *H04N 21/4312* (2013.01); *H04N 21/472* (2013.01); *H04N 21/8133* (2013.01)

(58) Field of Classification Search
CPC ............. H04N 21/4312; H04N 21/472; H04N 21/8133
See application file for complete search history.

(56) References Cited

U.S. PATENT DOCUMENTS

| | | |
|---|---|---|
| 7,236,227 B2 | 6/2007 | Whyte et al. |
| 7,351,150 B2 | 4/2008 | Sanchez |
| 7,366,546 B2 | 4/2008 | Grossman et al. |
| 7,620,426 B2 | 11/2009 | Ortiz et al. |
| 7,657,920 B2 | 2/2010 | Arseneau et al. |
| 7,824,268 B2 | 11/2010 | Harvey et al. |
| 7,855,638 B2 | 12/2010 | Huston |
| 7,908,616 B2 | 3/2011 | Jeong |
| 8,136,133 B2 | 3/2012 | Walker et al. |
| 8,244,105 B2 | 8/2012 | Verna |
| 8,388,445 B2 | 3/2013 | Pavlich et al. |
| 8,561,109 B2 | 10/2013 | Wallace et al. |
| 8,732,737 B1 | 5/2014 | Kalmes |
| 8,881,209 B2 | 11/2014 | Kalmes |
| 9,003,294 B1 | 4/2015 | Ames et al. |
| 9,033,781 B2 | 5/2015 | Steir et al. |
| 9,055,271 B2 | 6/2015 | Verna et al. |
| 9,141,859 B2 | 9/2015 | Vunic |
| 9,141,860 B2 | 9/2015 | Vunic et al. |
| 9,589,418 B2 | 3/2017 | Givant |
| 9,756,295 B2 | 9/2017 | Patel |
| 9,774,911 B1 | 9/2017 | Thomas |
| 9,788,071 B2 | 10/2017 | Mason et al. |
| 9,870,064 B2 | 1/2018 | Dimitrov et al. |
| 9,870,674 B2 | 1/2018 | Hayon |
| 9,888,296 B2 | 2/2018 | Marck et al. |
| 9,894,403 B2 | 2/2018 | Depies et al. |
| 9,905,082 B2 | 2/2018 | Dengler et al. |
| 10,086,231 B2 | 10/2018 | Hall |
| 10,165,339 B2 | 12/2018 | Huske et al. |
| 10,419,827 B2 | 9/2019 | Abrams |
| 10,425,697 B2 | 9/2019 | April et al. |
| 10,456,690 B2 | 10/2019 | Ghanchi |
| 10,474,336 B2 | 11/2019 | Smith |
| 10,621,784 B2 | 4/2020 | Khan et al. |
| 10,708,662 B1 | 7/2020 | Bourgoyne |
| 10,721,499 B2 | 7/2020 | Chang et al. |
| 10,771,423 B2 | 9/2020 | Selekman et al. |
| 10,798,193 B2* | 10/2020 | Wu .................. G06Q 50/01 |
| 10,873,774 B2 | 12/2020 | Loheide et al. |
| 10,943,435 B2 | 3/2021 | Hall et al. |
| 10,951,937 B2 | 3/2021 | Ng et al. |
| 10,953,322 B2 | 3/2021 | Trombetta et al. |
| 10,958,959 B1 | 3/2021 | Gibbon et al. |
| 11,050,977 B2 | 6/2021 | Yerli |
| 11,051,061 B2 | 6/2021 | Loheide et al. |
| 11,051,074 B2 | 6/2021 | Loheide et al. |
| 11,064,221 B2 | 7/2021 | Burkhart et al. |
| 11,115,701 B2 | 9/2021 | Depies et al. |
| 11,120,596 B2 | 9/2021 | Hariton |
| 2006/0020966 A1 | 1/2006 | Poslinski |
| 2006/0020971 A1 | 1/2006 | Poslinski |
| 2007/0060325 A1 | 3/2007 | Gradek |
| 2007/0157226 A1 | 7/2007 | Misra |
| 2007/0169143 A1 | 7/2007 | Li |
| 2007/0208628 A1 | 9/2007 | Amiri |
| 2007/0240190 A1 | 10/2007 | Arseneau et al. |
| 2009/0017749 A1 | 1/2009 | Braun |
| 2009/0089352 A1* | 4/2009 | Davis ................. G06F 3/0482 709/201 |
| 2009/0286604 A1 | 11/2009 | Clowes et al. |
| 2009/0290024 A1 | 11/2009 | Larson et al. |
| 2009/0312103 A1 | 12/2009 | Chen |
| 2010/0017820 A1 | 1/2010 | Thevathasan et al. |
| 2010/0138480 A1 | 6/2010 | Benedetto |
| 2010/0180297 A1 | 7/2010 | Levine et al. |
| 2011/0304735 A1 | 12/2011 | Van |
| 2012/0022918 A1 | 1/2012 | Ross |
| 2012/0094737 A1 | 4/2012 | Barclay et al. |
| 2012/0269494 A1 | 10/2012 | Satyanarayana et al. |
| 2013/0144716 A1 | 6/2013 | Xiong et al. |
| 2013/0321388 A1 | 12/2013 | Locke et al. |
| 2016/0050445 A1 | 2/2016 | Baghdassarian et al. |
| 2016/0234566 A1 | 8/2016 | Suoknuuti et al. |
| 2016/0249020 A1 | 8/2016 | Mingo |
| 2017/0244985 A1 | 8/2017 | Masterson |
| 2017/0246545 A1 | 8/2017 | Wilhite et al. |
| 2019/0026776 A1 | 1/2019 | Campbell |
| 2019/0030435 A1 | 1/2019 | Dishman |
| 2019/0089996 A1 | 3/2019 | Surcouf et al. |
| 2019/0163752 A1* | 5/2019 | Barlaskar ............... G06V 20/41 |
| 2020/0074321 A1 | 3/2020 | Chungapalli |
| 2020/0162796 A1 | 5/2020 | Azuolas et al. |
| 2021/0006752 A1 | 1/2021 | Garcia Kilroy et al. |
| 2021/0027576 A1 | 1/2021 | Nelson et al. |
| 2021/0049649 A1 | 2/2021 | Figueredo De Santana et al. |
| 2021/0049824 A1 | 2/2021 | Edwards |
| 2021/0056750 A1 | 2/2021 | Rowley |
| 2021/0076099 A1* | 3/2021 | Ganschow ....... H04N 21/47214 |
| 2021/0217126 A1 | 7/2021 | Hayon |
| 2022/0182708 A1* | 6/2022 | Ward ................. H04N 21/4858 |
| 2022/0408156 A1* | 12/2022 | Wright ............... H04N 21/4307 |
| 2023/0149819 A1* | 5/2023 | Pandhare ............. H04L 65/612 709/217 |

FOREIGN PATENT DOCUMENTS

| | | |
|---|---|---|
| EP | 1214841 A1 | 6/2002 |
| EP | 1505829 A1 | 2/2005 |
| EP | 2133846 A1 | 12/2009 |
| EP | 2701393 A1 | 2/2014 |
| EP | 2834726 A1 | 2/2015 |
| EP | 3000215 A1 | 3/2016 |
| EP | 3185562 A1 | 6/2017 |
| EP | 3188143 A1 | 7/2017 |
| EP | 3000215 B1 | 2/2018 |
| WO | 0067867 A2 | 11/2000 |
| WO | 0067867 A3 | 3/2001 |
| WO | 2010006435 A1 | 1/2010 |
| WO | 2011004381 A1 | 1/2011 |
| WO | 2013186663 A1 | 12/2013 |
| WO | 2014121208 A1 | 8/2014 |
| WO | 2017123453 A1 | 7/2017 |
| WO | 2018017878 A1 | 1/2018 |
| WO | 2018057267 A1 | 3/2018 |
| WO | 2020113273 A1 | 6/2020 |
| WO | 2020169163 A1 | 8/2020 |
| WO | 2021006836 A2 | 1/2021 |
| WO | 2021006836 A3 | 3/2021 |
| WO | 2021161132 A1 | 8/2021 |

* cited by examiner

METHODS AND SYSTEMS TO INCREASE INTEREST IN AND VIEWERSHIP OF CONTENT BEFORE, DURING AND AFTER A LIVE EVENT

BACKGROUND

The present disclosure relates to content delivery and, more particularly, to methods and systems for enhancing live event content transmitted from a content provider to a consumer device.

SUMMARY

Live shows (e.g., sporting events, reality shows, election coverage, and the like) have grown in popularity in the entertainment and media content delivery industries. In one approach, in a broadcast of a sports match, live event, or reality show, apart from the actual match, event, or show, additional content is provided before the show, during an interval, and after the show.

FIG. 9 depicts a timeline 905 of a live event 900. In some instances, the live event 900 is a live sports match 920, which includes a pre-match segment 910, a first half 925 of the match 920, an interval or halftime segment 930, a second half 935 of the match 920, and a post-match segment 940. With this approach, in some instances, viewership (i.e., a number of viewers) during the pre-match segment 910 and the post-match 940 is relatively low compared to viewership of the actual match 920.

For example, the pre-match segment 910 normally starts about 30 to 60 minutes before the actual match 920 (e.g., Super Bowl). The pre-match segment 910 includes live content such as live interviews, crowd gatherings at public places such as sports bars, expert panel discussions with multiple experts or commentators, and the like. Similarly, the post-match segment 940 starts after the main event 920 and includes content like the pre-match segment 910. The post-match segment 940 includes crowd gatherings, additional expert panel discussions, live interviews with players, fans and coaches, and the like. Viewers watch the content with a media device, e.g., a media device configured with internet protocol television (IPTV) or with a live over-the-top (OTT) subscription service. The content is delivered in a format chosen by a producer or editor. For example, in the pre-match segment, the producer might show an expert panel discussion first, then crowds gathering at a number of places, and a commercial break before the actual main event 920 begins. All viewers see the same edited feed 1135 (see FIG. 11).

Also, in the pre-match segment 910 and the post-match segment 940, the types of segments that are mixed and shown are occurring in parallel and live (see FIG. 11). For example, interviews, crowd celebrations, and expert panel discussions are happening in parallel. In many instances, content that is of particular interest to the user (e.g., statistics or an interview with a favorite player) is not transmitted at all. To illustrate the problem, as shown in FIG. 11, content feeds are discontinuous and/or overlapping in nature. The discontinuous and/or overlapping feeds are edited by the producer or editor to generate the edited feed 1135. In the example of FIG. 11, five different feeds—e.g., user-generated content (UGC) feed 1110, statistics feed 1115, expert panel feed 1120, crowd feed 1125, and interview feed 1130—are generated by five different feed sources in parallel. All five feeds 1110, 1115, 1120, 1125, 1130 simultaneously overlap at five different time ranges, i.e., at time $t_1$ to time $t_2$, at time $t_3$ to time $t_4$, at time $t_5$ to time $t_6$, at time $t_9$ to time $t_{10}$, and at time $t_{11}$ and thereafter (this example is merely illustrative and overlapping periods will vary from one live event to another). During these overlapping time ranges (e.g., $t_1$-$t_2$, $t_3$-$t_4$, $t_5$-$t_6$, $t_9$-$t_{10}$, and $t_{11}$ ...), only one of the five feeds 1110, 1115, 1120, 1125, 1130 can be shown, and the other four are not displayed in the edited feed 1135. Also, there is only one feed, the statistics feed 1115, that is exclusively available during any given time period, i.e., at time $t_7$ to time $t_8$. That is, from time $t_7$ to time $t_8$, the producer or editor has only one available live feed, the statistics feed 1115, for insertion into the edited feed 1135. Since all viewers see the same edited feed 1135, a viewer most interested, for example, in statistics, would be assured their favorite content from the statistics feed 1115 only from time $t_7$ to time $t_8$ and otherwise only if the producer or editor chooses to select the statistics feed 1115 instead of any of the other available feeds 1110, 1120, 1125, 1130. When the preferences of the producer or editor do not align with the preferences of the viewer interested in statistics, the viewer is left dissatisfied with the edited feed 1135. Further, too much relatively unpopular content (e.g., the crowd feed 1125) and not enough relatively popular content (e.g., the interview feed 1130) is made available to the producer or editor. The producer or editor thus has difficulty producing a desirable form of the edited feed 1135. As a result, the edited feed 1135 results in reduced viewership and lost revenue generated from advertising and sponsorships, which rely directly or indirectly on high viewership. Thus, there is a need for improved control and delivery of content including live events such as sports matches, reality shows, and the like.

The techniques of the present disclosure address these and other problems. Methods, systems, computer-readable media, apparatuses, techniques, devices, and articles are provided for improving control and delivery of content including sports matches, live events, reality shows, and the like. These techniques overcome the requirements and frustrations associated with above-referenced approach.

A system is provided for delivery of media content from a content provider to a media device through a communication system. In some embodiments, the system is configured to perform one or more methods related to control of content delivery. In one implementation, a server of a content provider delivers content to a device of a media consumer. The content is delivered directly to the device or via an intermediate system such as a cloud-based system. The content is temporarily or permanently stored in a local storage device or on the cloud-based system. The content is cast from one device to another device. One or more content streams from the server, the cloud, or the local storage device is transmitted to one or more devices.

In some embodiments, a user of one device initiates a request for media content from a content provider server. The content provider server receives the request. The content provider server also may receive one or more of an inputted content preference, a user profile, an analysis of content consumption, and metadata of the media content item. The content provider server determines a content preference based on any suitable input. The suitable input may be one or more of the inputted content preference, the user profile, the analysis of the content consumption, the metadata of the media content item, and a predicted content preference. The content preference may be predicted based on one or more of the inputted content preference, the user profile, the analysis of the content consumption, and the metadata of the media content. The content provider server receives metadata regarding at least one of a plurality of media content streams determined to be related to the media content item. The content provider server determines a distribution of the at least one of the plurality of media content streams based on the determined content preference. The content provider server generates for display a preferred media content stream including one or more portions of the at least one of the plurality of media content streams based on the distribution.

In some embodiments, for each of the plurality of media content streams, a weighted percentage of a total running time of the media content item is determined based on the distribution, where the total running time corresponds with 100%.

In some embodiments, in response to determining that at least two of the plurality of media streams include concurrent live content, one of the at least two of the plurality of media streams is generated for display in a main display area; and a selectable option for each of the at least two of the plurality of media streams not included in the main display area is generated for display. The selectable option is superimposed over the main display area. Upon selection of the selectable option, the main display area is switched to the selected one of the at least two of the plurality of media streams not previously included in the main display area.

In some embodiments, in response to determining that at least two of the plurality of media streams include concurrent live content, a grid is generated for display. The grid includes a plurality of display sections. Each of the plurality of display sections includes one of the at least two of the plurality of media streams determined to include concurrent live content.

In some embodiments, in response to determining that at least two of the plurality of media streams include concurrent live content, at least one of the two of the plurality of media streams is generated for display including concurrent live content in a first display area. Another of the at least two of the plurality of media streams is generated for display including concurrent live content in a second display area. The preferred media content stream is displayed on a main display. In response to determining that at least two of the plurality of media streams include concurrent live content, and in response to determining that at least one additional display is available, one of the at least two of the plurality of media streams including concurrent live content is generated for display on the main display. Another of the at least two of the plurality of media streams is generated for display including concurrent live content on the at least one additional display determined to be available.

In some embodiments, in response to determining that at least two of the plurality of media streams include concurrent live content and overlap, a priority for each of the at least two of the plurality of media streams is determined based on the distribution. A highest priority media stream is determined based on the determined priority. The highest priority media stream is included in the preferred media content stream during the overlap. Non-preferred media stream(s) are excluded from the preferred media content stream during the overlap.

In some embodiments, in response to determining that at least two of the plurality of media streams include concurrent live content and overlap for a first period of time, a priority is determined for each of the at least two of the plurality of media streams based on the distribution. A highest priority media stream is determined based on the determined priority. A second highest priority media stream is determined based on the determined priority. The highest priority media stream is included in the preferred media content stream during the overlap for the first period of time. Non-preferred media stream(s) are excluded from the preferred media content stream during the overlap for the first period of time. In response to determining that at least two of the plurality of media streams contain concurrent live content and overlap for a second period of time, the second highest priority media stream is included in the preferred media content stream during the overlap for the second period of time. The highest priority stream and the non-preferred media stream(s) are excluded from the preferred media content stream during the overlap for the second period of time.

In some embodiments, in response to determining that only one of the plurality of media streams contains concurrent live content, the only one of the plurality of media streams is included in the preferred media content stream until detecting that another of the plurality of media streams contains concurrent live content.

In some embodiments, the media content item includes audiovisual content of a live event. The live event is one of a sports event, a reality show, a weather report, a political event, a stock market report, and a news report.

In some embodiments, the plurality of media content streams includes at least one or all of a main stream, a statistics stream, an expert panel stream, a crowd stream, an interview stream, a previous event stream, a user-generated content stream, and an advertising stream.

A system is provided to increase viewership of and interest in content including live events, sporting events, and reality shows. A profile of a user is accessed. An interest level of a user is determined based on analysis of the accessed profile. A primary content stream is generated for display including display of the content item. A subject related to a content item is determined. A likelihood the subject related to the content item displayed in the primary content stream is of interest to the user is determined based on the determined interest level of the user based on the analysis of the accessed profile. In response to the determining the likelihood satisfies a predetermined condition, a secondary content stream is generated for display including display of supplemental content including at least the subject related to the content item.

In some embodiments, the generating for display includes displaying the secondary content stream on one or more of a full screen of a client device, a picture-in-picture screen of the client device, a grid display on the client device, and a second client device. The secondary content stream includes one or more of pre-event content, interval content, halftime show content, post-event content, live content, pre-recorded content, a pre-packaged information segment, statistics content, an expert panel discussion, a view of a crowd, a view of a gathering, and an interview with a subject of the live event. The generating for display includes automatically switching between the primary content stream and the secondary content stream based on an analysis of data including one or more of user preferences, the accessed profile, metadata of the content item, and a viewing history of the user.

In some embodiments, a client device performs one or more of the accessing, the determining of the interest level, the generating for display of the primary content stream, the determining of the subject, the determining of the likelihood, and the generating for display the secondary content stream. In some embodiments, a server-side device performs one or more of the accessing, the determining of the interest level, the generating for display of the primary content stream, the determining of the subject, the determining of the likelihood, and the generating for display of the secondary content stream.

In some embodiments, the primary content stream is a continuous stream. The primary content stream is prepared by an editor at a server-side device. The primary content stream includes one or more of a segment type playing state, an open-ended playing state, and a discontinuous playing state.

In some embodiments, the secondary content stream is a stream of a predetermined type. The secondary content stream is available for display when the type of content is available live and being recorded and/or transmitted. The secondary content stream is one or more secondary content streams including a user-generated content (UGC) stream, a statistics stream, an expert panel stream, a crowd stream, and an interview stream.

In some embodiments, metadata is associated with the content item. The metadata includes one or more of a content identifier, a title, a duration, and a playlist field. The playlist field includes a playlist type, and a uniform resource locator (URL) for each playlist type. Each URL includes one or more of a protocol, a subdomain, a domain name, a top-level domain, a folder name, a playlist type, a playlist filename, and a playlist file extension. The playlist type corresponds to the primary content stream or the subject of the secondary content stream. The playlist file extension is m3u8.

In some embodiments, the primary content stream is provided in a primary mode without the secondary content stream. In some embodiments, the primary content stream is provided in a secondary mode with the secondary content stream on a single screen. The secondary content stream is provided as part of a user interface. The user interface is configured with one or more user-selectable options corresponding to one or more secondary content streams.

In some embodiments, in response to selection of one of the one or more secondary content streams, the selected secondary content stream replaces the primary content stream. In response to selection of one of the one or more secondary content streams, the selected secondary content stream is presented in a primary position, and the primary content stream is presented in a secondary position. The secondary content stream is determined to be available until an EXT-X-DISCONTINUITY tag is received. In response to the receipt of the EXT-X-DISCONTINUITY tag, display of the secondary content stream is automatically replaced with the primary content stream, and/or availability of another secondary content stream is determined. If another secondary content stream is available, display of the secondary content stream is automatically replaced with another secondary content stream.

In some embodiments, the user profile includes information of viewing history based on content type or segment type. The secondary content stream includes content filtered by segment type.

In some embodiments, content is filtered based on a determination of a preference of the user for each segment type, and/or content is filtered based on a determination of a preference for content of each segment type to be played on a client device. A rank of each of the filtered segment types is based on metadata. The metadata is based on the user profile.

In some embodiments, the secondary content stream includes a plurality of secondary content streams ranked based on the metadata based on the user profile. An availability of a top-ranked secondary content stream is determined. The top-ranked secondary content stream is displayed if available until a contrary signal is transmitted. If the top-ranked secondary content stream is not available, then the primary content stream is displayed. The contrary signal is an EXT-X-DISCONTINUITY tag. In response to receiving the EXT-X-DISCONTINUITY tag, an availability of a second highest ranked secondary content stream is determined. The second highest ranked secondary content stream is displayed if available. If the second highest ranked secondary content stream is not available, then the primary content stream is displayed. The secondary content stream is selected for display based on an availability of content. The primary content stream is presented as a default unless the secondary content stream satisfies a predetermined standard.

In some embodiments, display of the secondary content stream is based on noise in decibels received from a decibel meter meeting or exceeding a predetermined number of decibels. Display of the secondary content stream is based on a motion analysis system. The crowd motion analysis system is trained to identify motion indicative of a score in a sporting event.

In some embodiments, a percentage and/or a duration of a segment type for display as the secondary content stream is determined. The percentage and/or the duration of the segment type is calculated based on the profile of the user and a viewing history of the user. The primary content stream is the same for all users, and/or the primary content stream includes a static, predetermined proportion of content by content type. The secondary content stream includes a dynamic proportion of content by content type. The dynamic proportion of the content by the content type is based on the profile of the user or a viewing history of the user. The dynamic proportion of the content by the content type is based on one or more of viewing times of the content types of the content, received input from the user indicating preferences for content types of the content, and an analysis of user profiles determined to be likely to be similar to the profile of the user. The primary content stream includes a targeted primary content feed based on a determined cluster of viewers having common attributes. The cluster is determined based on machine learning techniques. The targeted primary content feed is edited by an editor. The secondary content stream includes content uploaded from a video sharing platform or a social media platform.

In some embodiments, supplemental content is displayed in the secondary content stream in response to a signal indicating a score, or a notable event. The score or the notable event is detected based on analysis of one or more of on-screen information, object analysis, audio analysis, entry of a signal, and monitoring of social media. The secondary content stream includes content based on a location or a geographic area. The secondary content stream includes content from a scored source. The score is higher if from a verified user and lower for an unverified user. The secondary content stream includes content generated by a verified user or a verified expert in each topic.

In some embodiments, advertisements playing on the primary content stream are the same as or different than advertisements playing on the secondary content stream. The advertisements playing on the secondary content stream are targeted to the user.

In some embodiments, an availability of the secondary content stream is dependent on one or more of entitlement or licensing rights associated with the content item. An electronic program guide is updated to include information regarding the secondary content stream. The content of the secondary content stream is made available on demand for at least a period after live broadcast. The on-demand content is chaptered.

In some embodiments, identification of an event of interest is included in the primary content stream. The secondary content stream is based on the identified event of interest in the primary content stream.

In some embodiments, the primary content stream is a stream of a sporting event. The event of interest is one or more of, in football, an interception, a one-handed catch, a legal trick play, a two-point conversion, a Hail Mary, a last second field goal; in baseball, a perfect game, a no hitter, a double play, a triple play, a stolen base, a walk-off home run; in hockey, a hat trick, a short-handed goal, a power play goal; in basketball, a slam dunk, a buzzer beater; in soccer, a bicycle kick, a penalty kick; in golf, a hole-in-one, an eagle; in bowling, a three-hundred score, conversion of a 7-10 split, a perfect score in a scored sport, a perfect 10 in gymnastics, a record-breaking performance in a sport, a photo finish, and a winning play or score as time runs out, and the like.

In some embodiments, the primary content stream is a stream of a reality show. The event of interest is one or more of formation of an alliance, designation of a leadership position, association of a contestant with an event of negative consequence, and association of a contestant with an event of positive consequence.

In some embodiments, the primary content stream is a stream of one or more of weather reporting, a political event, an election results show, stock market reporting, general news reporting, and breaking news reporting. The secondary content stream is the stream of the election results show. The secondary content stream includes display of video including one or more of past speeches by a candidate, statistics about the election, polling leading up to the election, maps and charts relating to the statistics and the polling, exit polling, expert analysis, a live stream from a location of interest, reactions from individuals or viewer groups, and a live stream of a crowd.

A system is provided including control circuitry configured for performing one or more functions noted above. A device is provided including means for performing one or more functions noted above. One or more non-transitory, computer-readable media having non-transitory, computer-readable instructions encoded thereon is provided. The instructions, when executed by control circuitry, cause the control circuitry to perform one or more functions noted above. One or more methods for performing one or more of the functions noted herein are provided. The techniques and approaches disclosed herein address and overcome the problems of prior approaches.

Notably, the present disclosure is not limited to the combination of the elements as listed herein and is assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein are better understood by referring to the following description in conjunction with the accompanying drawings, in which like reference numerals indicate identically or functionally similar elements, and in which.

Figure 1A:
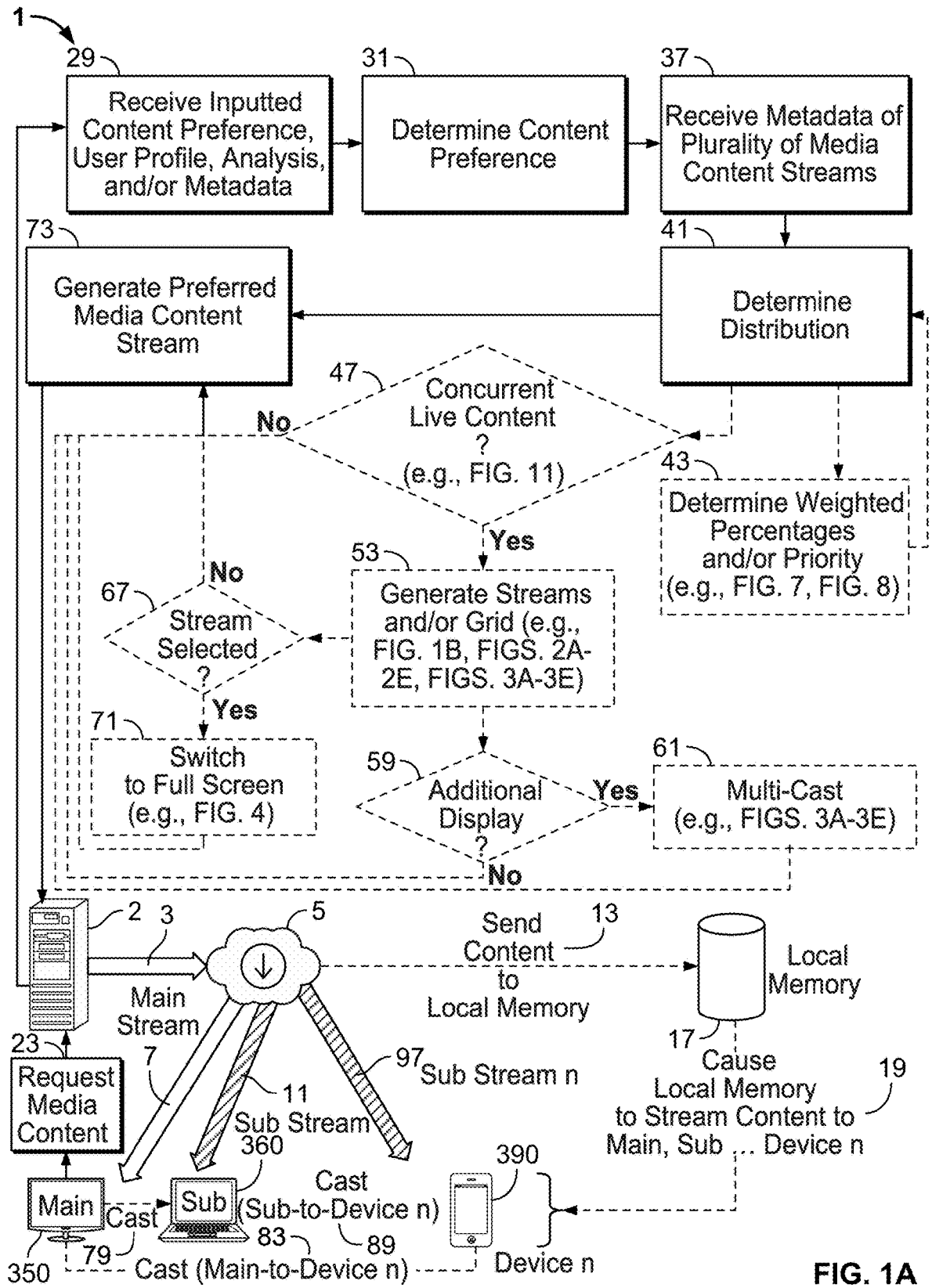
FIG. 1A depicts a schematic overview of a media content delivery system including a cloud-based streaming distribution system, a storage system, and one or more user devices, as well as a flowchart relating to processing of a request from a user device resulting in generation of a preferred media content stream, in accordance with some embodiments of the disclosure.
Figure 2A:
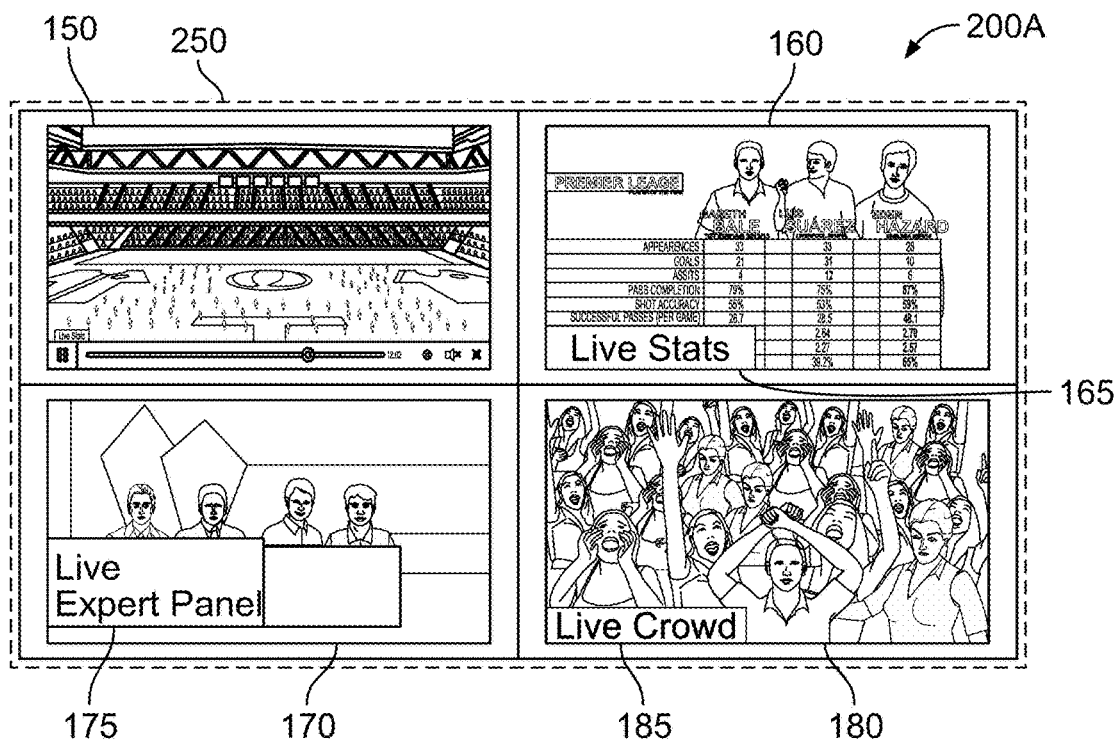
FIG. 2A depicts a grid pattern display including one selectable primary feed and three selectable secondary feeds in a grid pattern, in accordance with some embodiments of the disclosure.
Figure 2B:
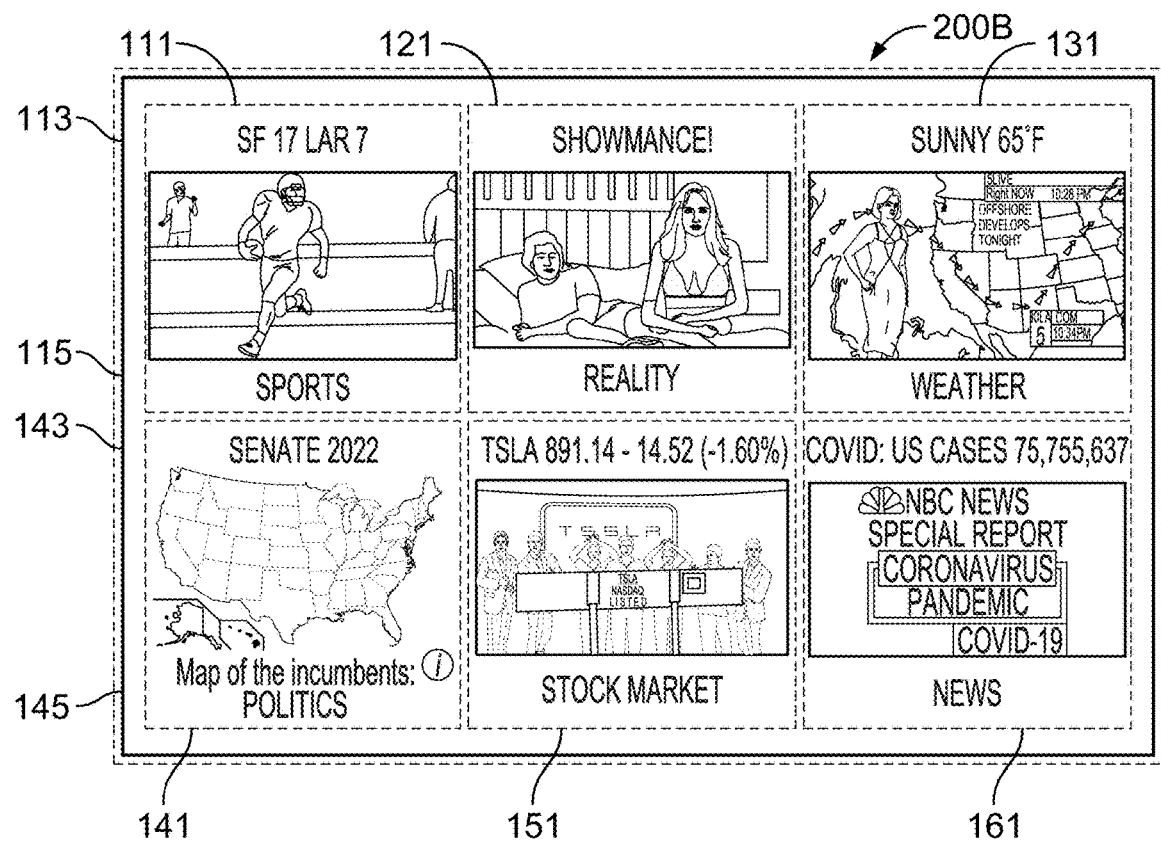
FIG. 2B depicts a grid pattern display including six selectable feeds, in accordance with some embodiments of the disclosure.
Figure 2C:
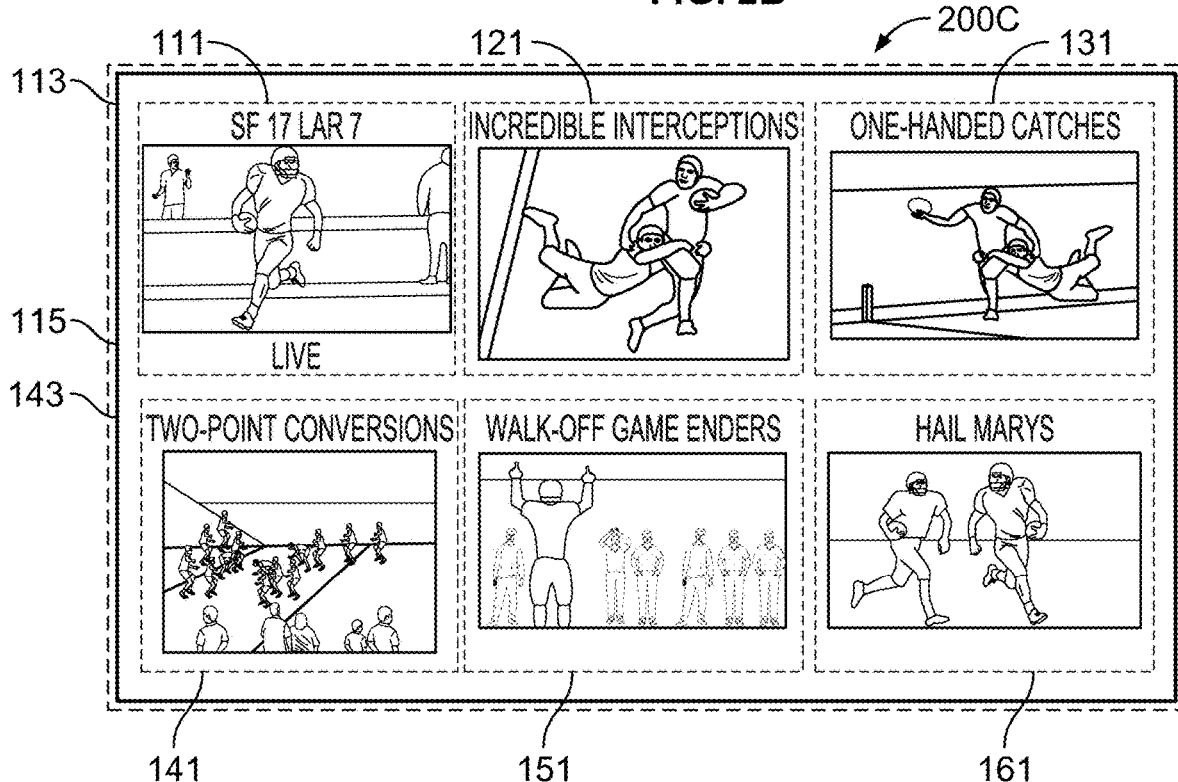
FIG. 2C depicts a grid pattern display after selection of the first of the six selectable feeds of FIG. 2B, along with five additional selectable feeds including supplemental content determined to be related to a subject of the first selectable feed (i.e., different types of plays from football, the sport shown in the selected feed), in accordance with some embodiments of the disclosure.
Figure 2D:
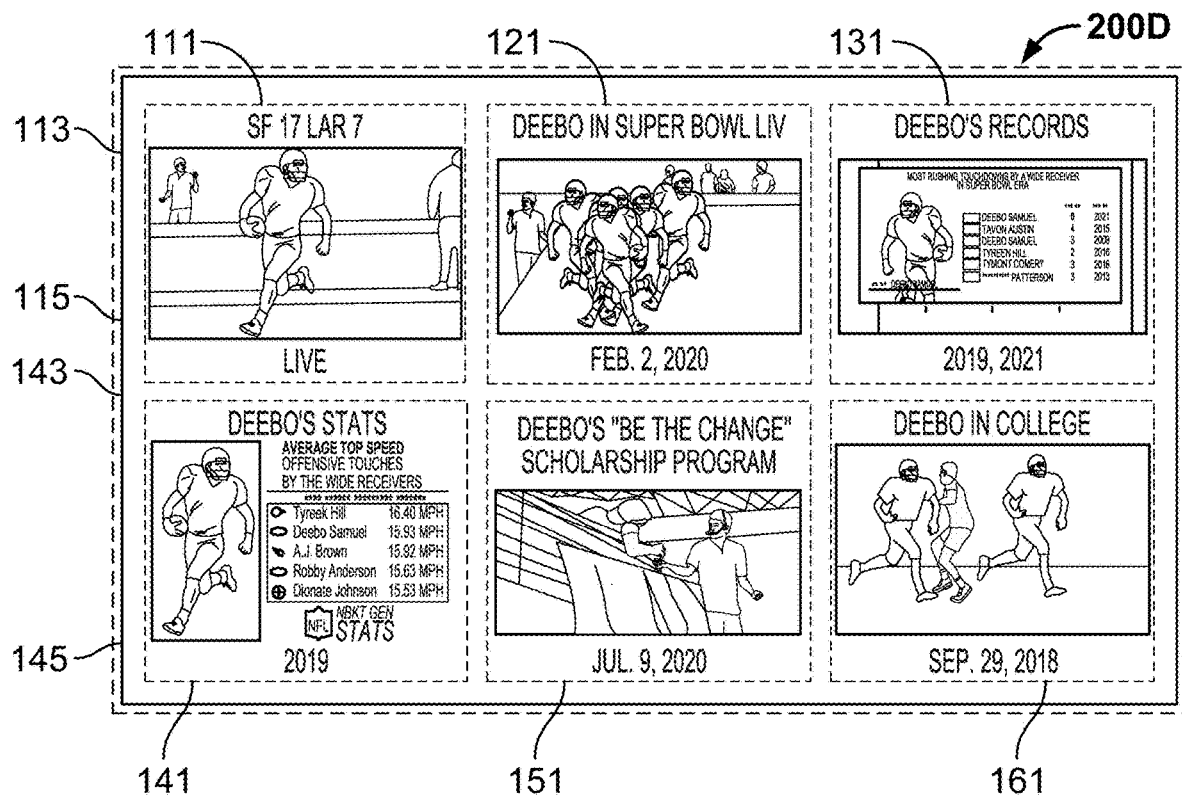
FIG. 2D depicts a grid pattern display after selection of the first of the six selectable feeds of FIG. 2B or FIG. 2C, along with five additional selectable feeds including supplemental content determined to be related to a subject of the first selectable feed (i.e., various feeds about Deebo Samuel, the athlete shown in the selected feed), in accordance with some embodiments of the disclosure.
Figure 2E:
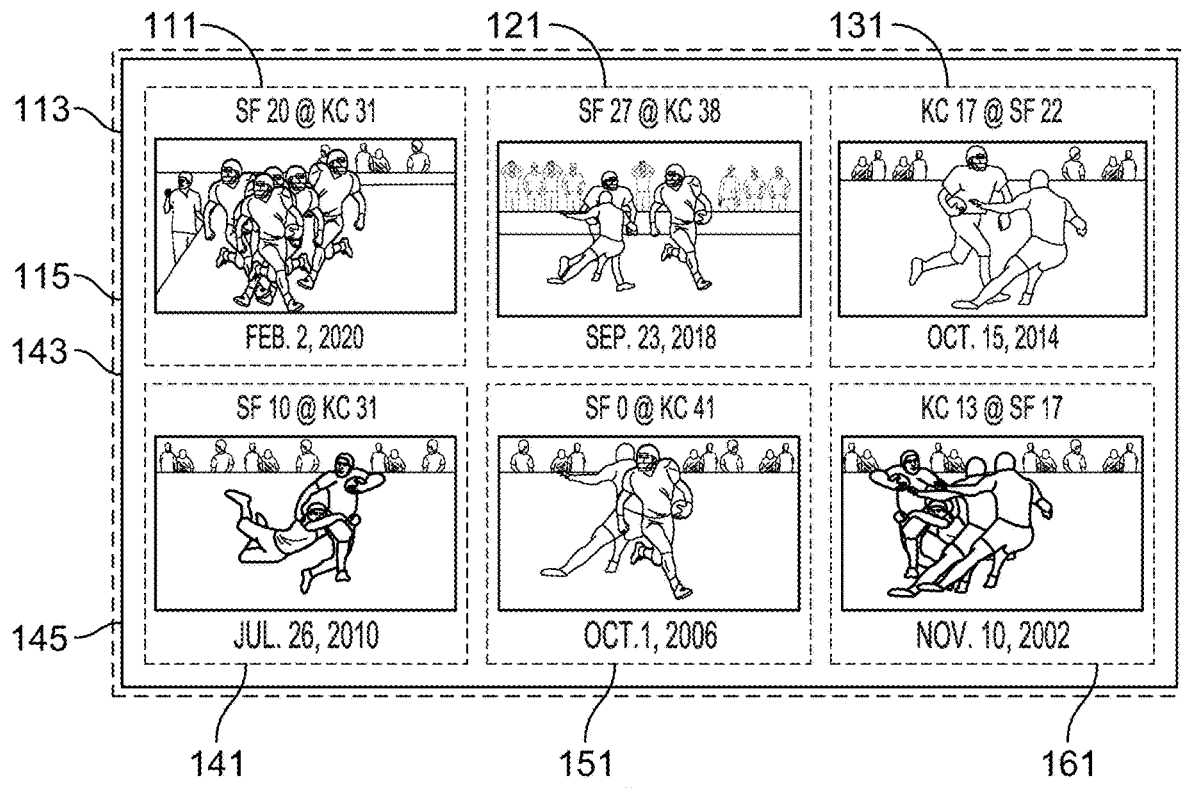
Figure 3A:
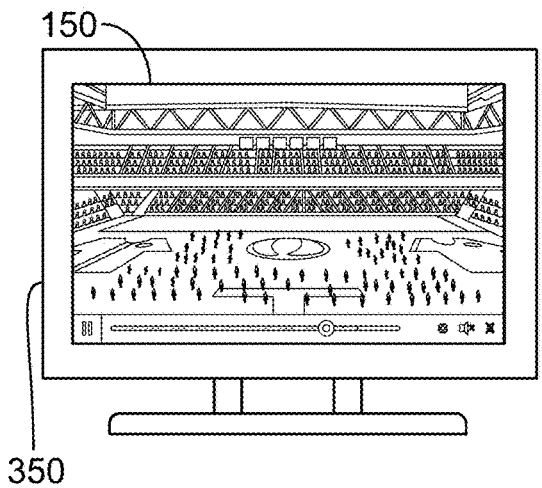
Figure 3B:
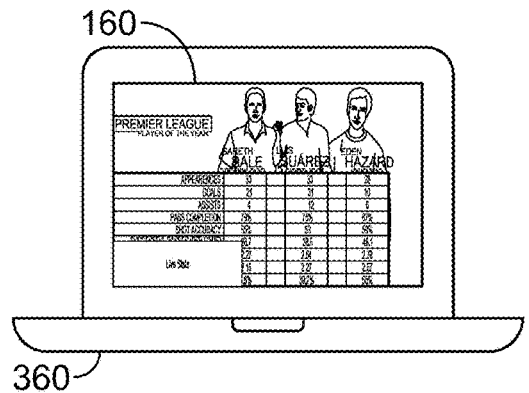
Figure 3C:
Figure 3D:
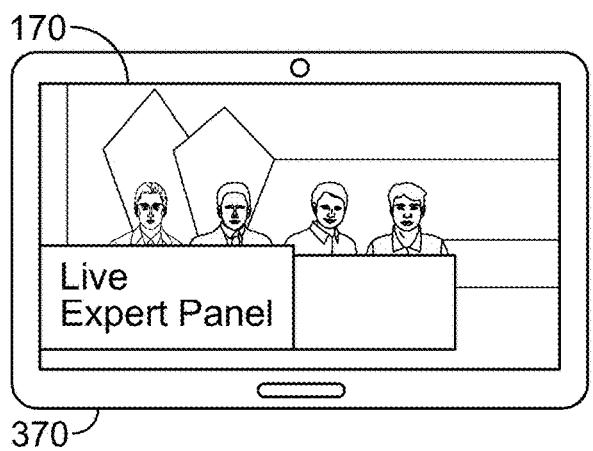
Figure 3E:
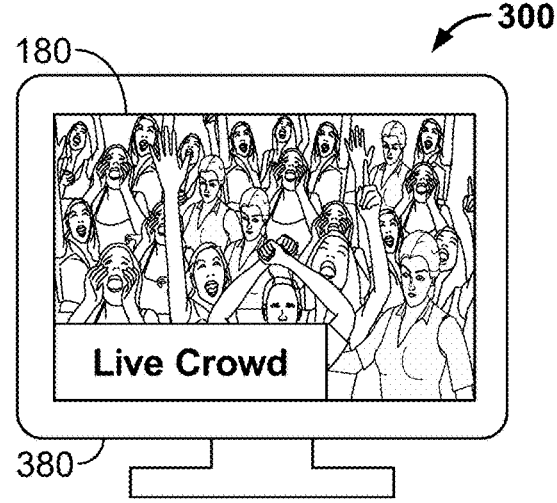
Figure 4:
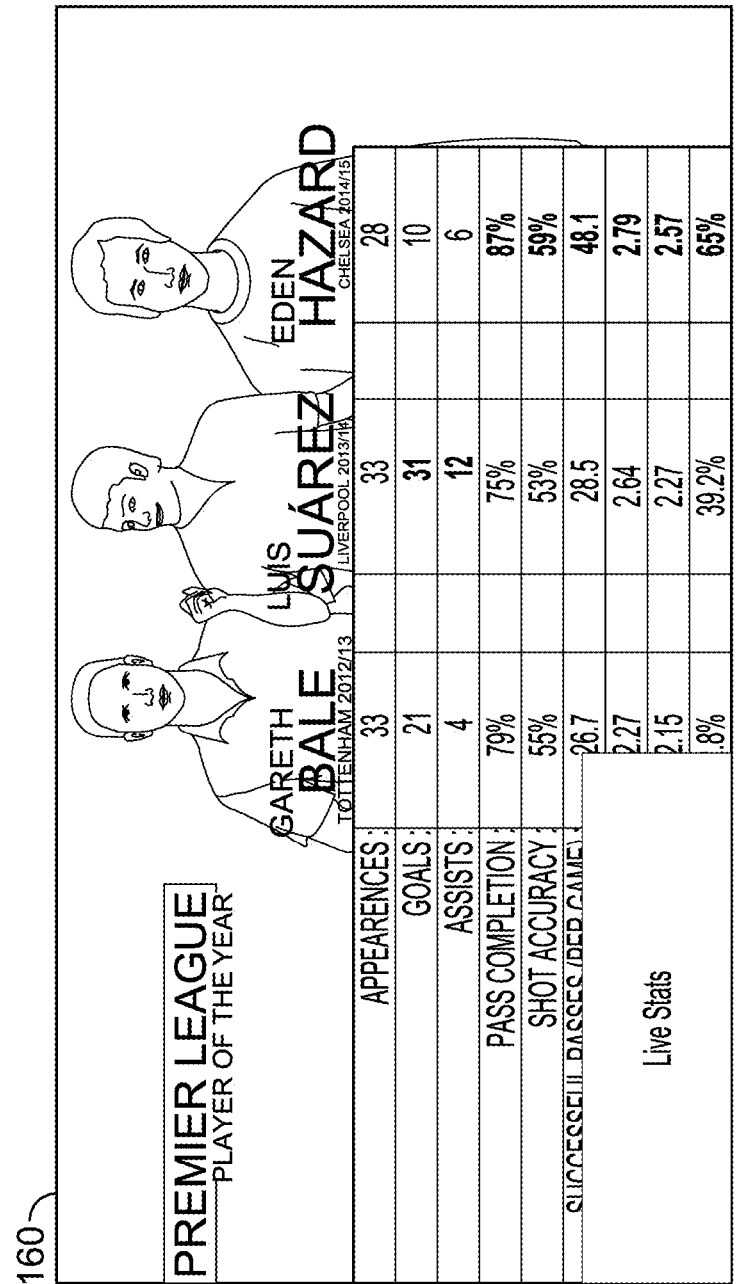
Figure 5:
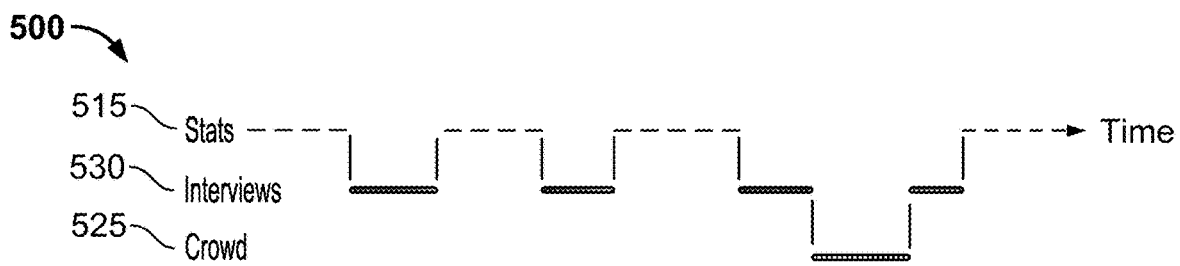
Figure 6:
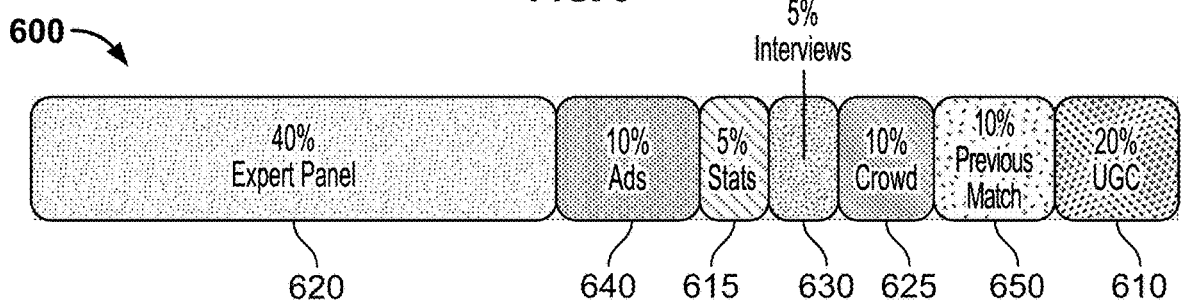
Figure 7:
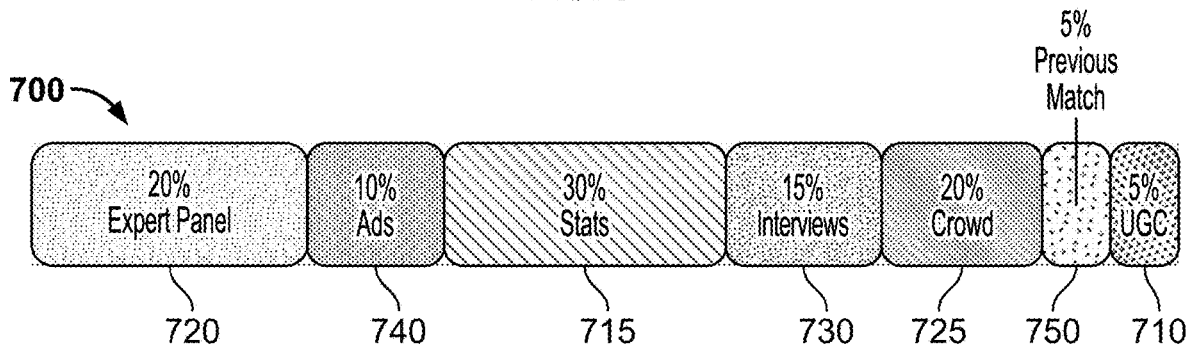
Figure 8:
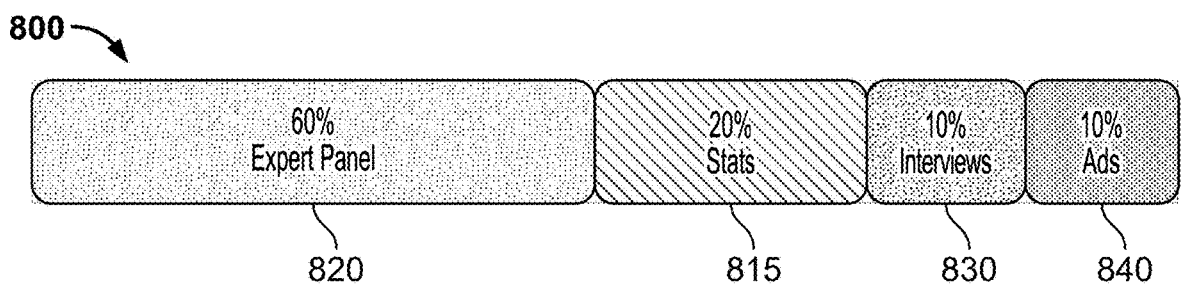
Figure 9:
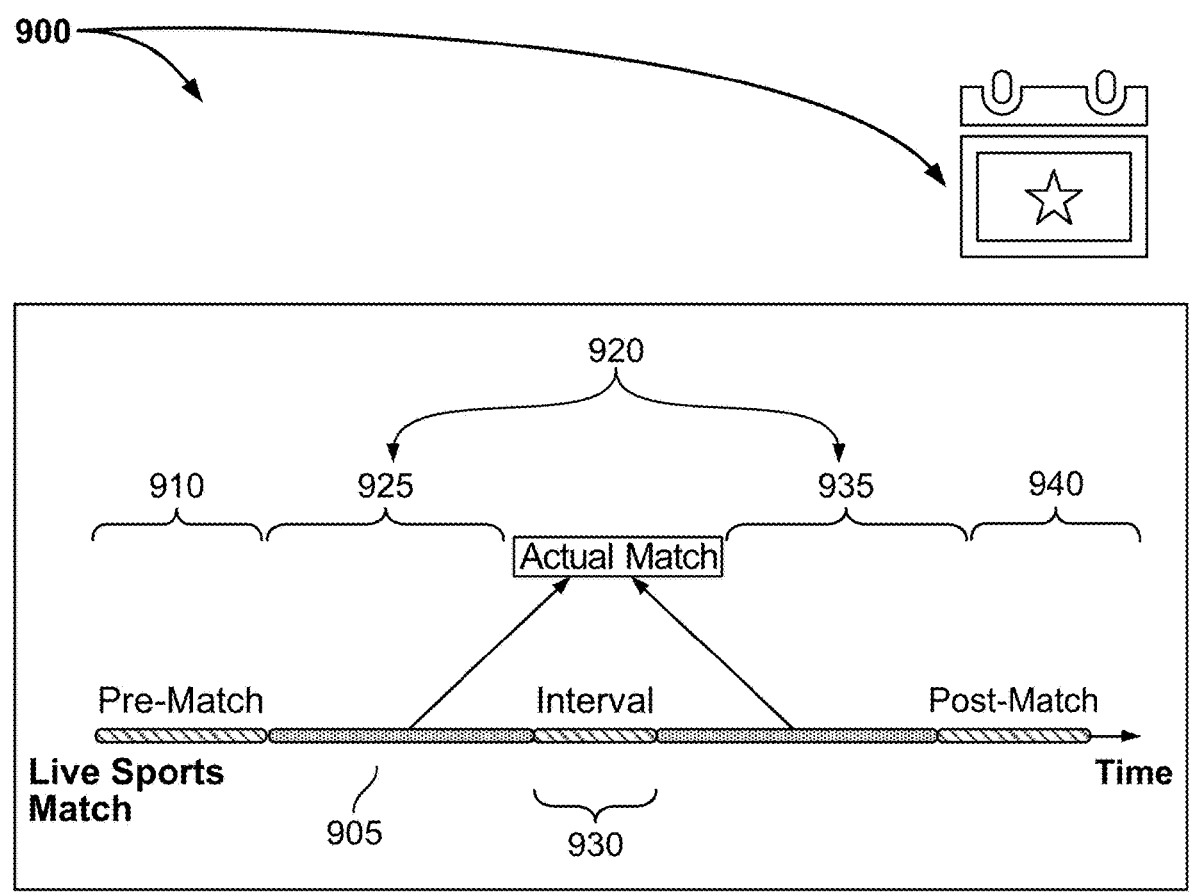
Figure 10:
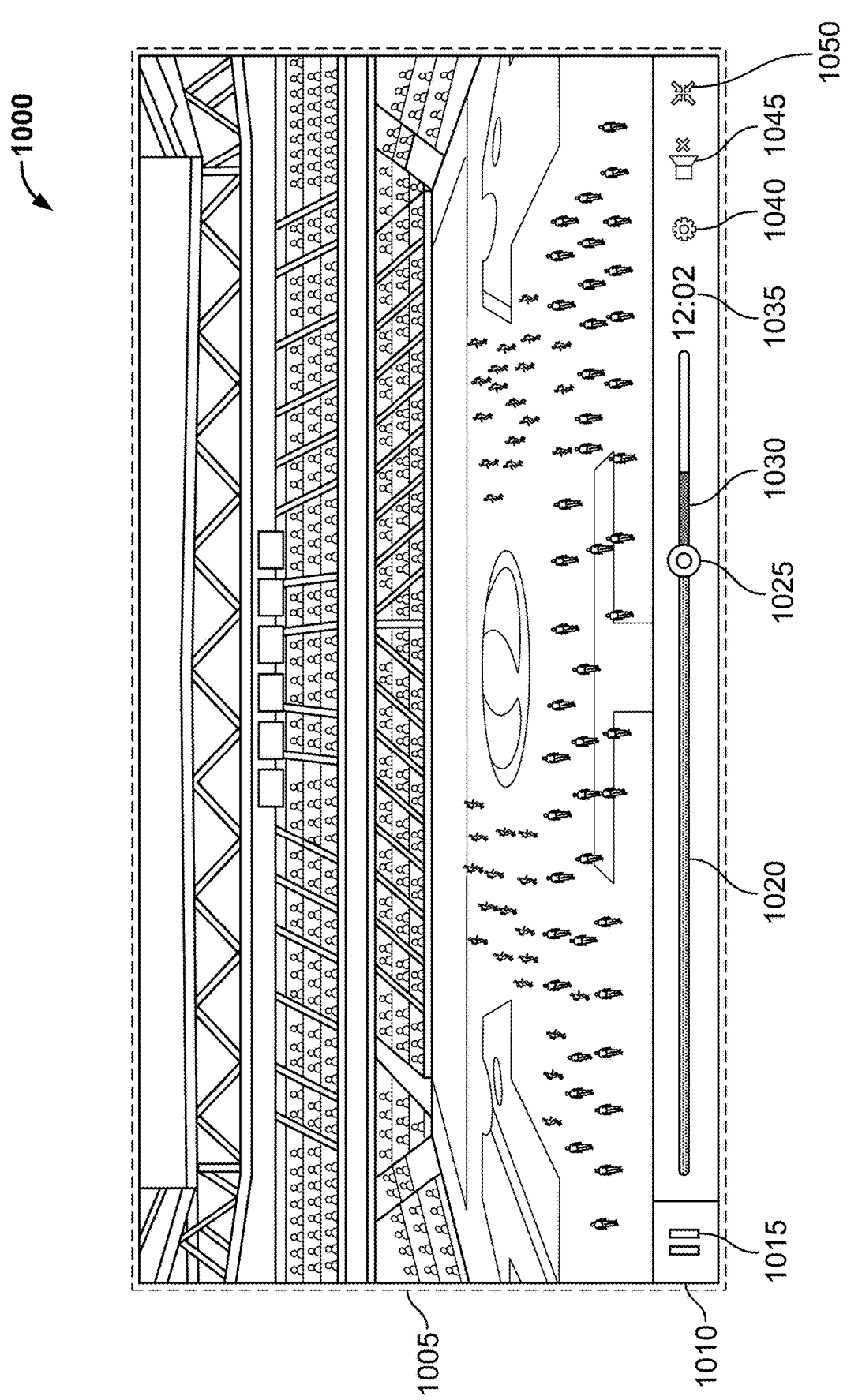
Figure 11:
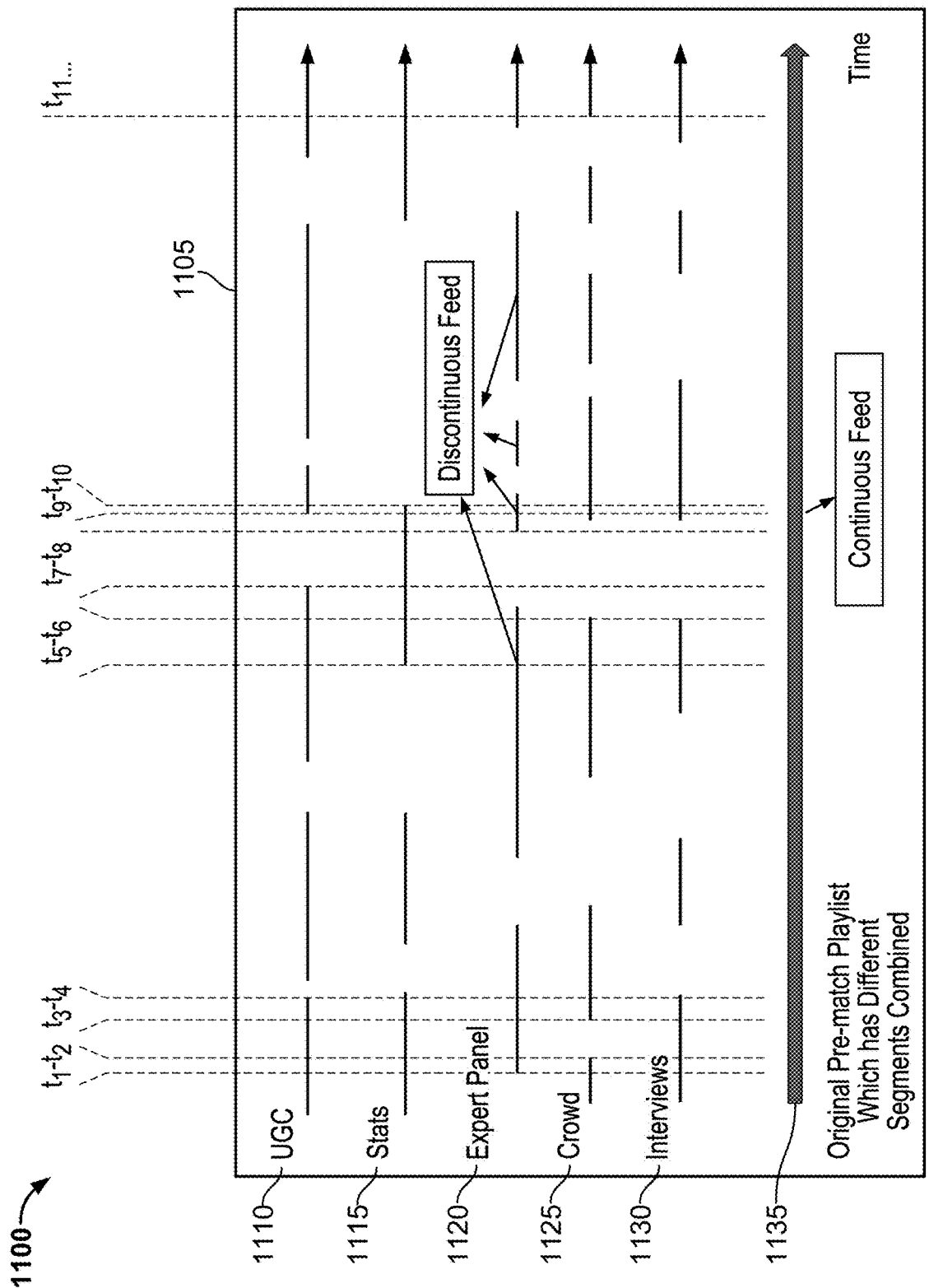
Figure 12:
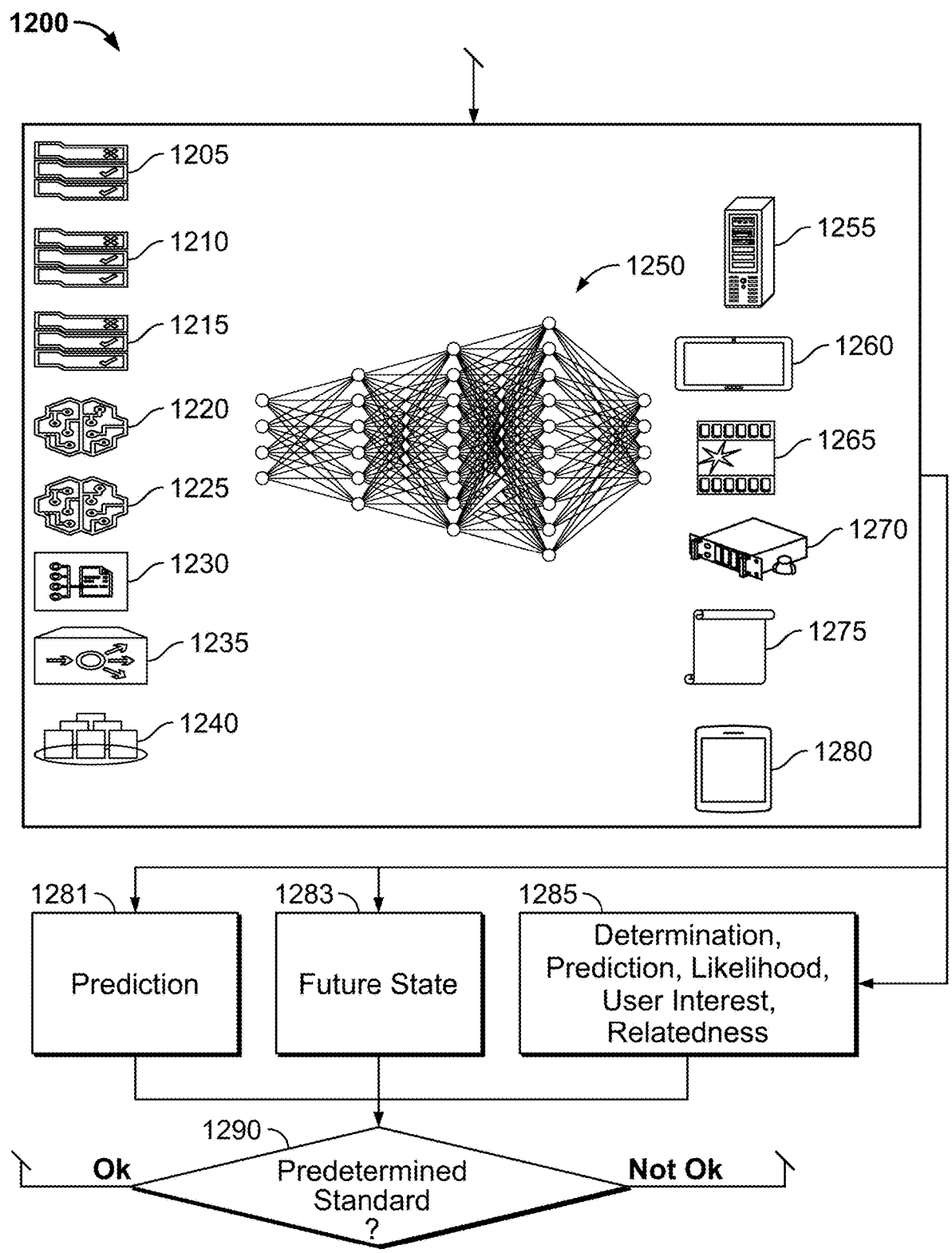
Figure 13:
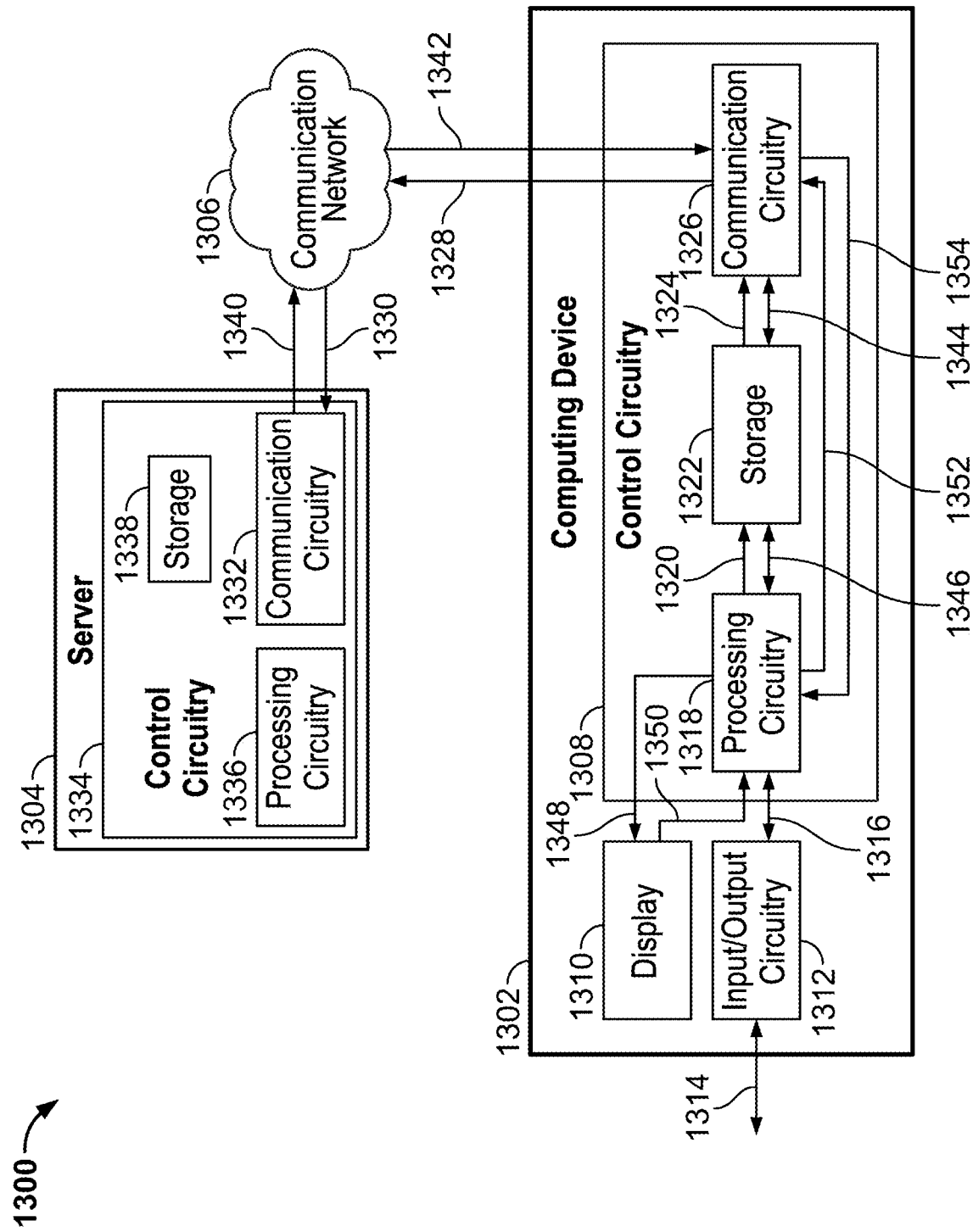
Figure 14A:
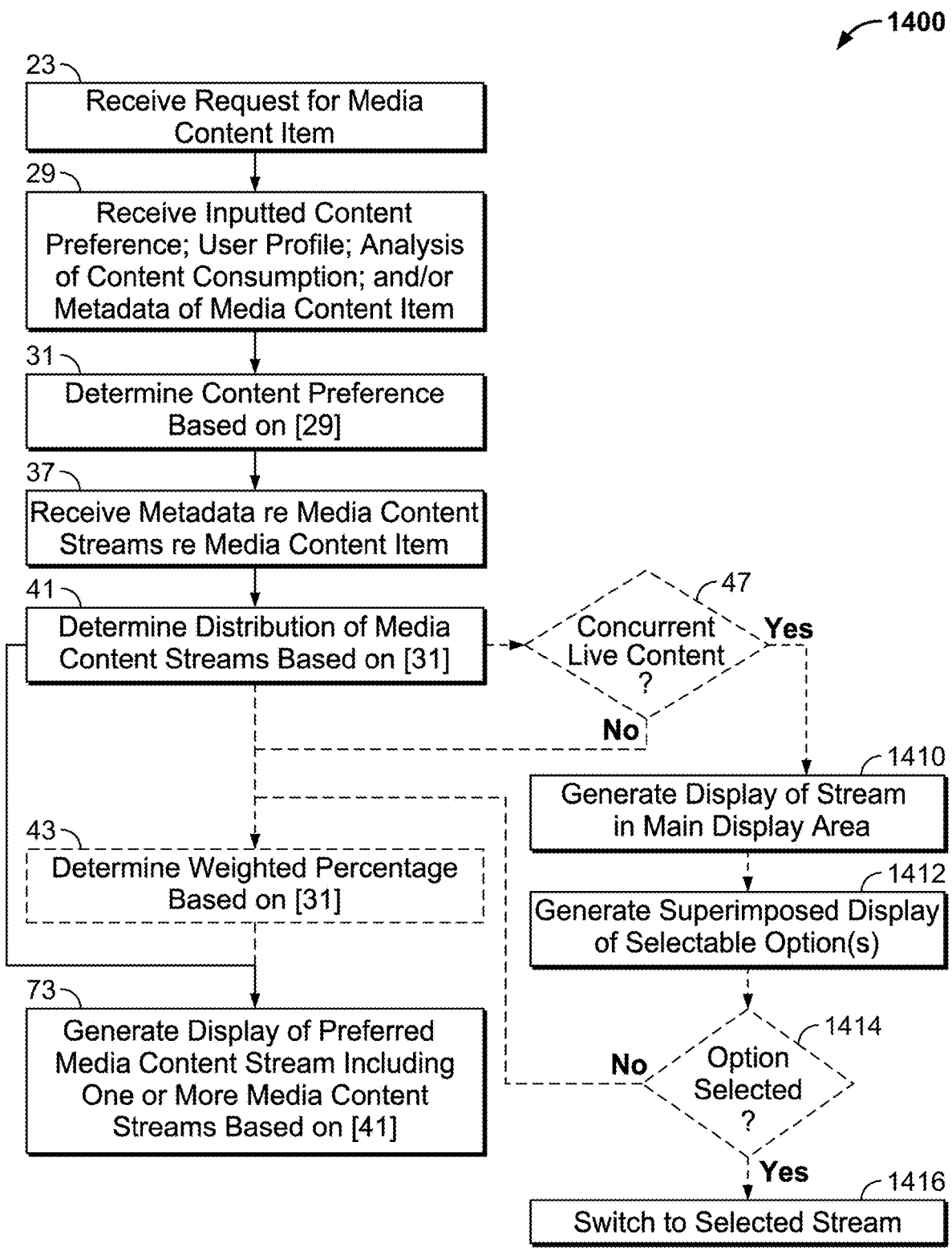
Figure 14B:
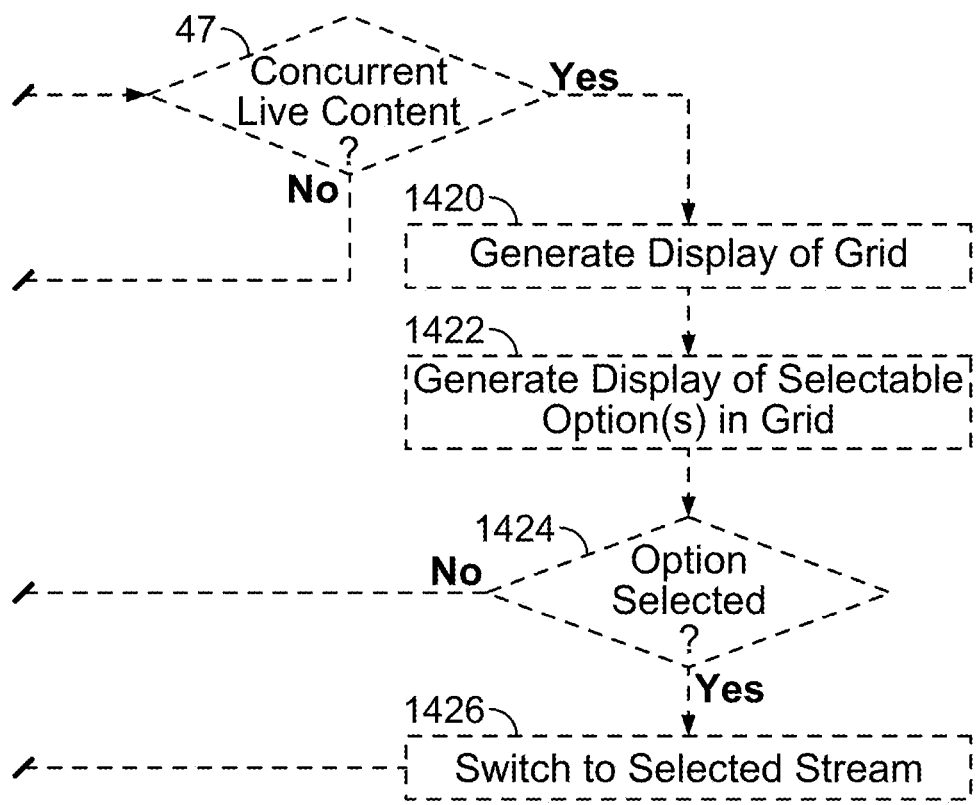
Figure 14C:
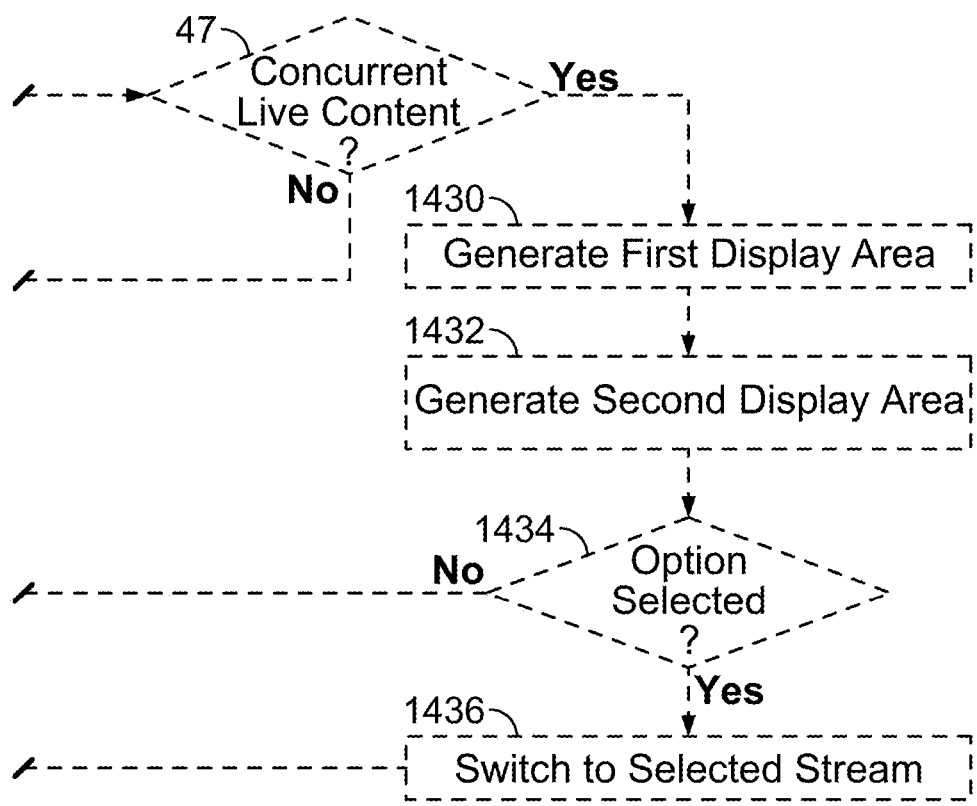
Figure 14D:
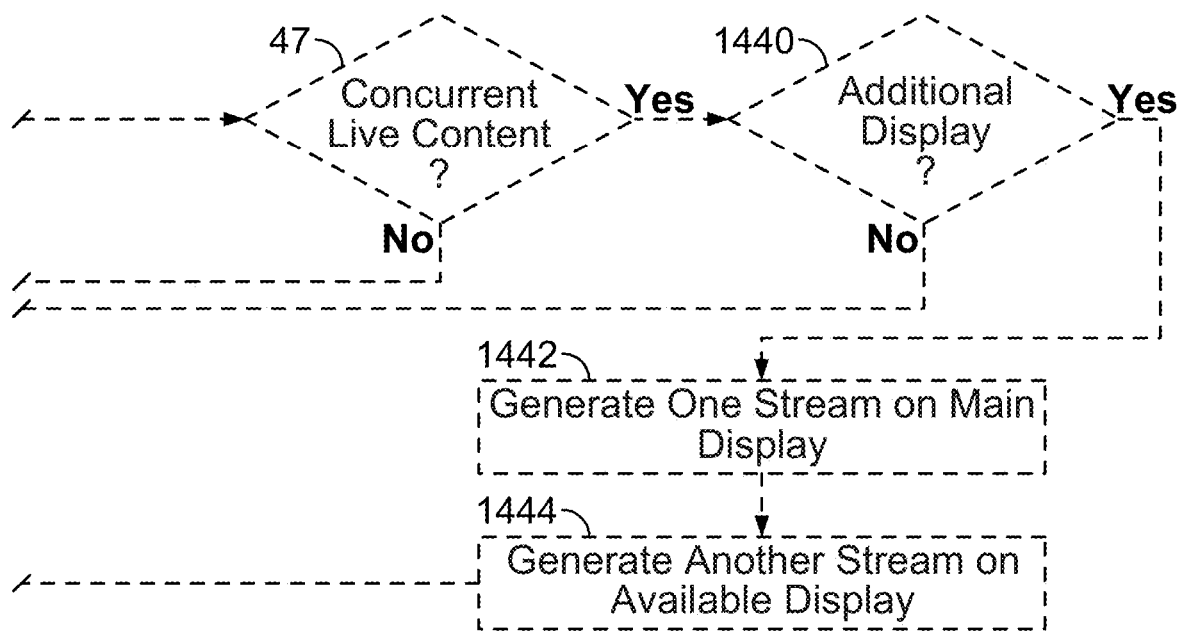
Figure 14E:
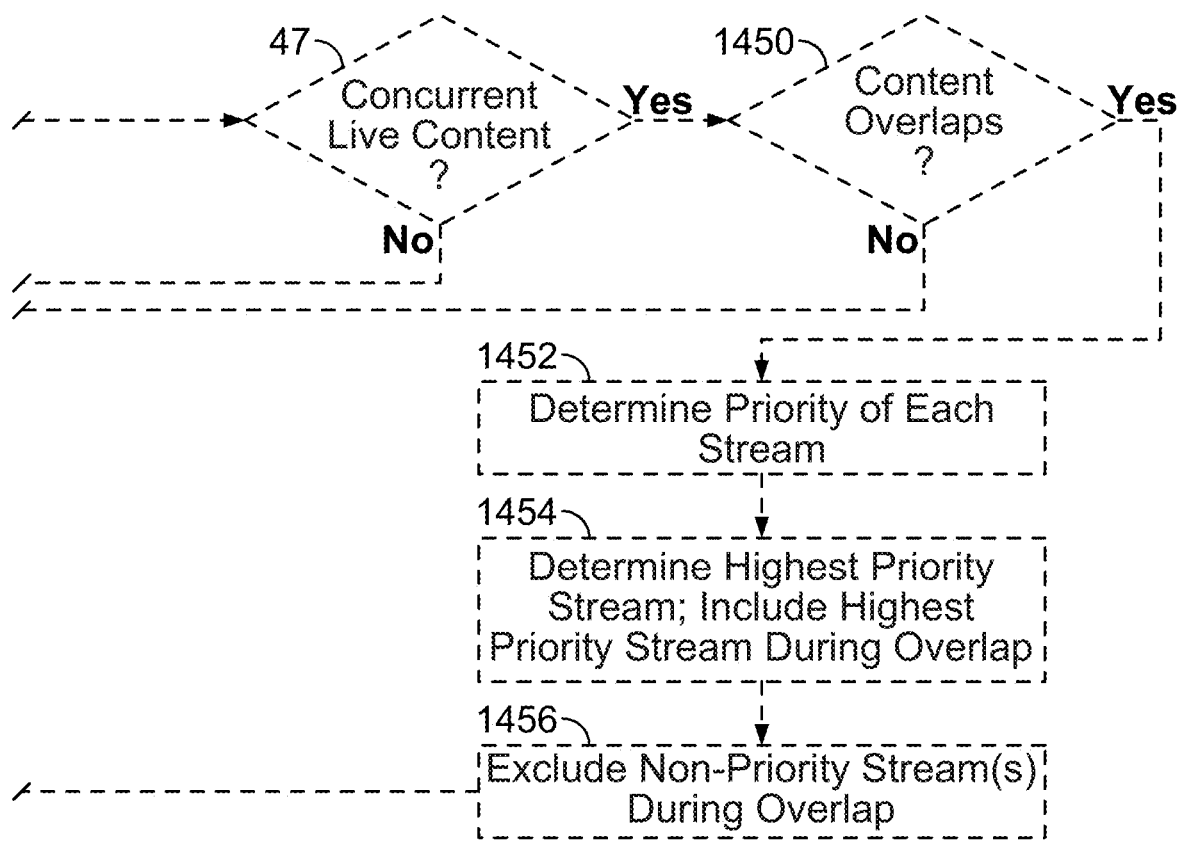
Figure 14F:
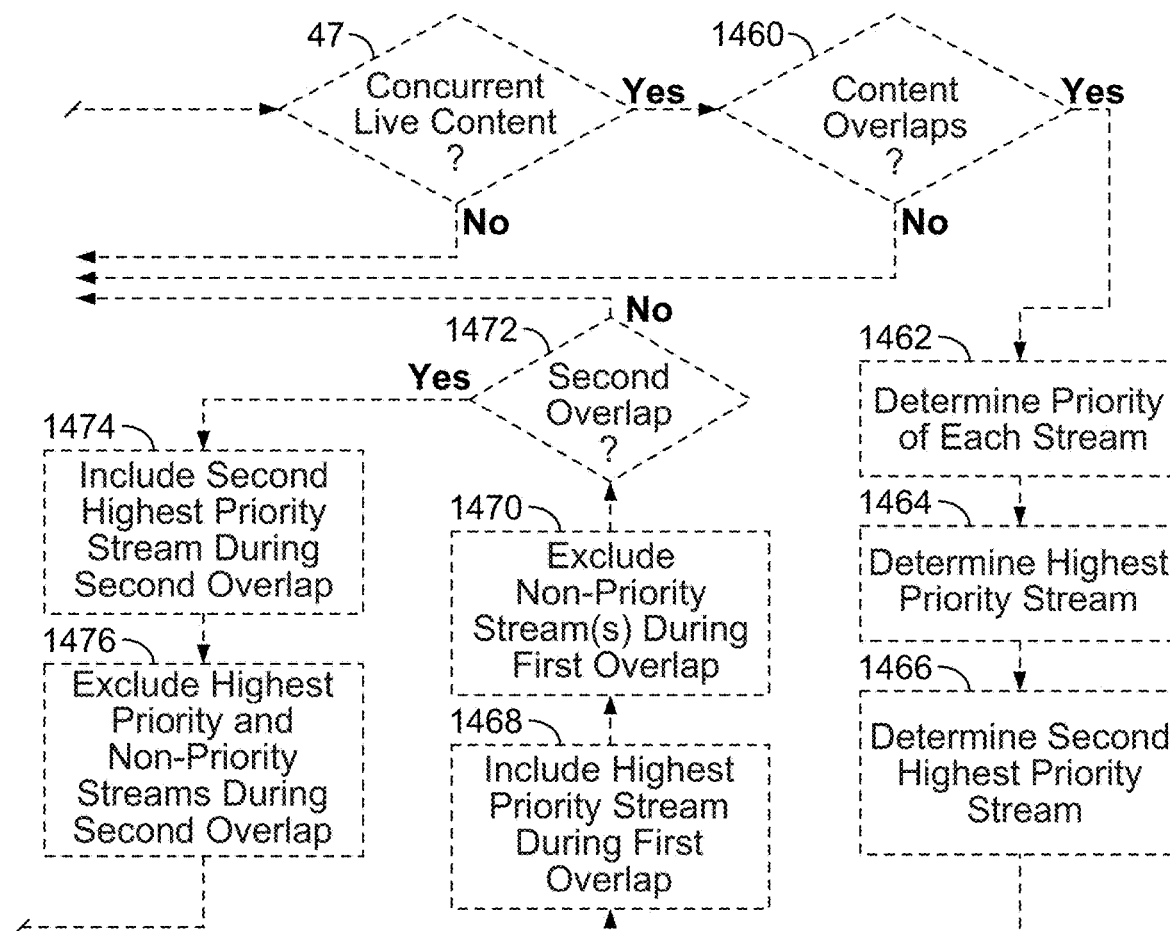
Figure 14G:
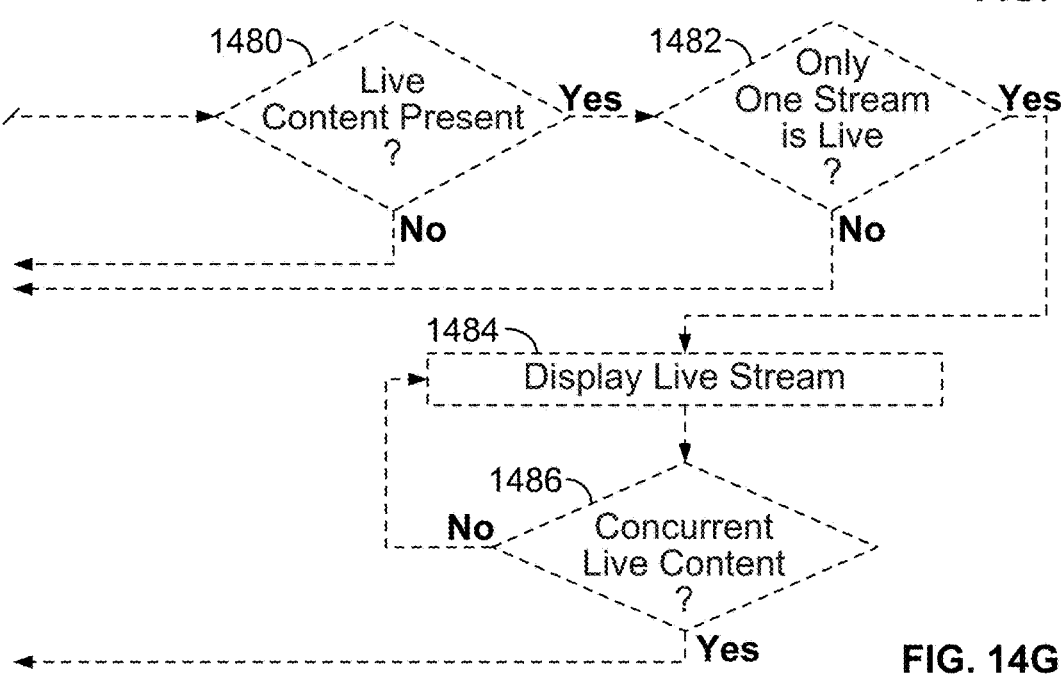
Figure 15:
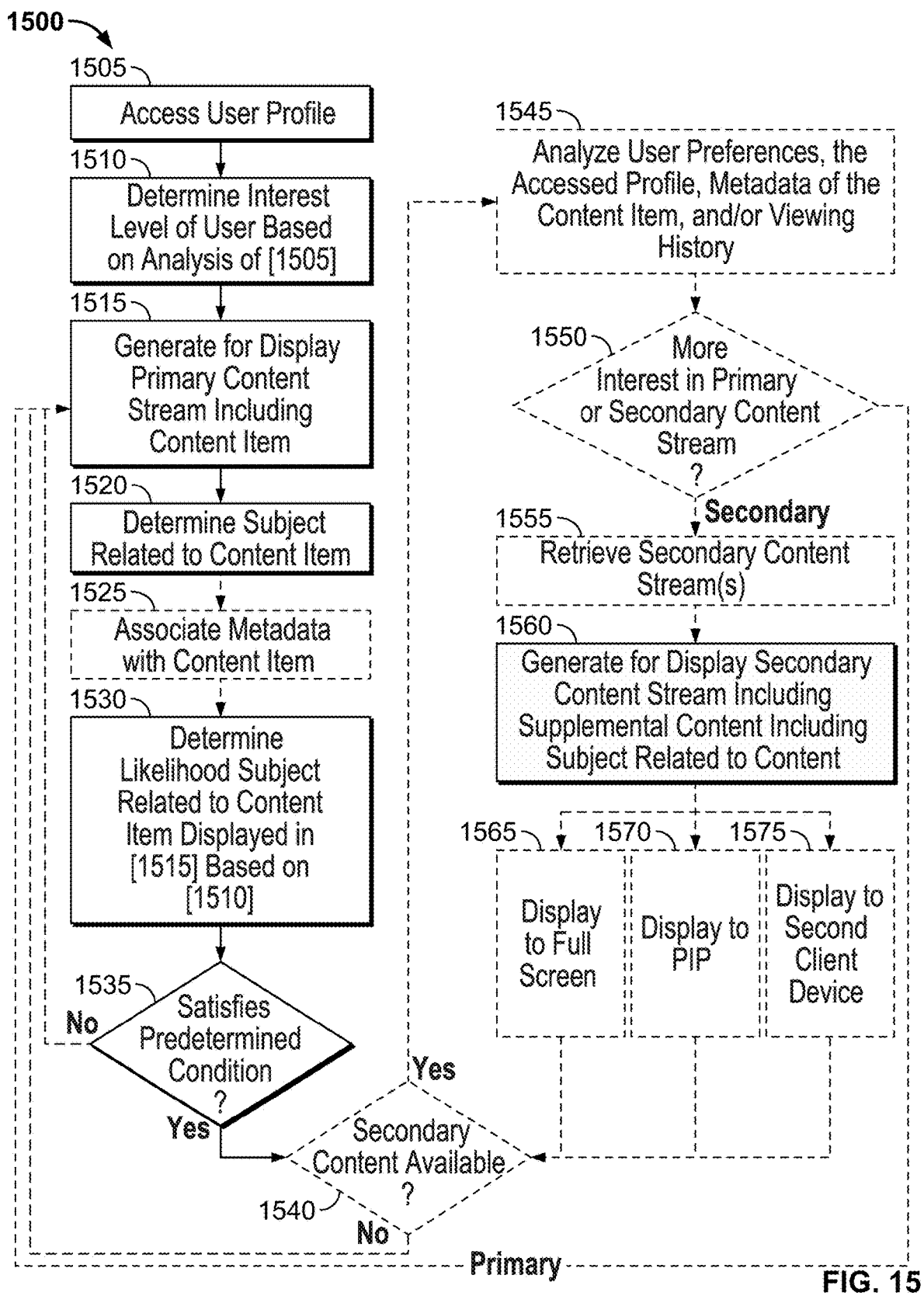

FIG. 2E depicts a grid pattern display after selection of the second of the six selectable feeds of FIG. 2D, along with five additional selectable feeds including supplemental content determined to be related to a subject of the second selectable feed (i.e., various feeds about games between the San Francisco 49ers and the Kansas City Chiefs, the event shown in the selected feed), which has been shifted into the first position, in accordance with some embodiments of the disclosure;

FIG. 3A depicts a smart television displaying the primary feed, according to an embodiment;

FIG. 3B depicts a laptop displaying a live statistics feed, according to an exemplary embodiment;

FIG. 3C depicts a smartphone displaying an interview feed, according to an exemplary embodiment;

FIG. 3D depicts a tablet displaying a live expert panel feed, according to an exemplary embodiment;

FIG. 3E depicts a computer monitor displaying a live crowd feed, according to an exemplary embodiment;

FIG. 4 depicts a full screen display of the live statistics feed, according to an exemplary embodiment;

FIG. 5 depicts a timeline including a representation of the integration of the statistics feed, the interview feed, and the crowd feed into a dynamically generated customized feed, according to an exemplary embodiment;

FIG. 6 depicts percentages of content statically divided by segment type, according to an exemplary embodiment;

FIG. 7 depicts percentages of content dynamically divided by segment type based on a first user's profile, according to an exemplary embodiment;

FIG. 8 depicts percentages of content dynamically divided by segment type based on a second user's profile, according to an exemplary embodiment;

FIG. 9 depicts a timeline of a live event, according to an exemplary embodiment;

FIG. 10 depicts a primary feed, according to an exemplary embodiment;

FIG. 11 depicts a timeline of a live event, and a continuous feed including portions of five separate feeds, according to an exemplary embodiment;

FIG. 12 depicts a predictive model, according to an exemplary embodiment;

FIG. 13 depicts a system for controlling and delivering media content, according to an exemplary embodiment;

FIG. 14A depicts a flowchart including selected portions of the flowchart of FIG. 1A and further including details regarding concurrent live content and selectable options, according to an exemplary embodiment;

FIG. 14B depicts a flowchart including selected portions of the flowchart of FIG. 14A and further including details regarding a grid pattern display, according to an exemplary embodiment;

FIG. 14C depicts a flowchart including selected portions of the flowchart of FIG. 14A and further including details regarding first and second display areas, according to an exemplary embodiment;

FIG. 14D depicts a flowchart including selected portions of the flowchart of FIG. 14A and further including details regarding a main display and an additional display, according to an exemplary embodiment;

FIG. 14E depicts a flowchart including selected portions of the flowchart of FIG. 14A and further including details regarding overlapping content and prioritization, according to an exemplary embodiment;

FIG. 14F depicts a flowchart including selected portions of the flowchart of FIG. 14A and further including details regarding overlapping content and prioritization, according to an exemplary embodiment;

FIG. 14G depicts a flowchart including details regarding the presence, absence, and display of live content, according to an exemplary embodiment; and FIG. 15 depicts a flowchart relating to processing of a user profile, determination of a level of interest, determination of related content, display of secondary content, generation of a preferred media content stream, and display options, according to an exemplary embodiment.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments.

DETAILED DESCRIPTION

Systems and methods are provided to increase viewership of and interest in content including live events, sporting events, and reality shows. Techniques are provided for presenting secondary feeds (e.g., if deemed of interest to a user) that are determined to be related to primary content. In some embodiments, the user selects any of the secondary feeds to watch on a full screen, in a picture-in-picture, and/or on a second device. For some types of live events, the content includes pre-event and post-event content, live content, pre-recorded content, pre-packaged information segments, statistics, expert panel discussions, crowd views, gathering views, interviews, and the like. The systems and methods increase viewership of portions of or an entirety of the event. Instead of broadcasting a static feed mixed by an editor, in which all viewers see the same content, a dynamic feed is provided. The dynamic feed is more interesting to the user and includes options for additional content determined to be of particular interest to the user. As a result, more interesting coverage of events is delivered, resulting in higher viewership and user satisfaction.

The systems and methods are generally directed to generating improved viewership of and interest in content including live events, sporting events, and reality shows utilizing improved content delivery (including streaming content delivery, primary content delivery, and secondary content delivery), analysis of media content items, user interaction, automatic control without user interaction, display configurations, user interfaces, selectable options, live and non-live content, temporal considerations, determinations, predictions, likelihoods, measurements of user interest measurements of relatedness, content availability, user-generated content, identification and delivery of content of particular interest to a user, metadata analysis, playlist generation, concurrent live content availability, and the like.

For example, many sports fans like different aspects of a given sport. Some fans exhibit a preference for (e.g., higher-than-average interest in) one type of content versus another, the types of content including, e.g., interviews with players, expert panel discussions, crowd gatherings, crowd celebrations, statistics, predictions, the various pre-match, interval, and post-match segments described herein, and the like.

In one exemplary embodiment, the dynamic feed includes segments provided as separate parallel feeds. In some embodiments, multiple playlists are provided. The systems and methods to increase viewership of content include one or more of the following: live and/or parallel feeds of one or more segments of pre-match and/or post-match content; personalized segments of pre-match and post-match content for end users; one or more secondary playlists or feeds; one or more multiple EXT-X-DISCONTINUITY playlists; multiple EXT-X-DISCONTINUITY playlists simultaneously displayed on a single screen; and auto switching between one or more feeds, segments, content, and/or playlists based on an analysis of data including preferences, a profile, metadata, and/or viewing history. The embodiments herein are executed at the client side and/or the server side.

Content Categorization by Segment Type

In one exemplary embodiment, a system 1, 1300 (depicted in FIGS. 1A and 13, respectively) is configured to generate instructions for display of one or more segments of a match, an event, and/or a show. In the context of a sporting event, for example, categories include pre-match, interval, and post-match (e.g., FIG. 9). For example, in the context of the sporting event, in some embodiments, the pre-match content has a duration of about 30 to 60 minutes. The pre-match content includes segments such as: expert panel discussion, practice sessions, pre-match conference, player interviews, statistics (e.g., players, game, opponents, and the like), crowd gathering, user-generated content (e.g., content generated by viewers in a stadium, and the like), and a prediction. In some embodiments, the interval content has a duration of about 15 to 30 minutes. The interval content includes segments such as: expert panel discussion, statistics (e.g., determined to be related to the match, determined to be related to the players), a revised prediction, and highlights or important moments from the previously broadcast content. In some embodiments, the post-match content has a duration of about 30 to 60 minutes. The post-match content includes segments such as: celebration of winning team, emotions of losing team, crowd celebration, post-match presentation, press conference, match highlights, important moments of game, and interviews of players, coaches, and fans. This example is non-limiting. The types of segments noted above included may be omitted or duplicated, and additional types of segments may be added without limitation. In some embodiments, the segments are occurring in parallel, occurring live, and discontinued in nature. For example, if a pre-match segment is about 30 minutes, 10 minutes of player interviews are provided in a discontinuous manner through the 30-minute segment. The player interview content may be provided as one continuous segment or discontinuously in multiple segments between other types of segments.

In some embodiments, the system 1, 1300 retains an option to present a primary feed or playlist, which is prepared by an editor at a server side in the traditional manner.

The system 1, 1300 is configured in some embodiments to include, in addition to the primary playlist option, one or more secondary playlists. One or more of the secondary playlists may have one or more attributes. The attributes of the secondary playlists include the following: a segment type, open-ended playing state, a discontinuous playing state, and the like. Each type of secondary playlist may be available to organize the type of content. In some exemplary implementations, when a segment becomes available for any type, the segment is pushed to a respective segment type playlist. For example, when a player interview is happening and being recorded, the player interview content is pushed to an interview segment type playlist. Content may be pushed to a respective playlist as it becomes available. The primary playlist is continuous in nature.

In some embodiments, the system 1, 1300 is configured to include metadata for each of the secondary playlists. For example, for a given event, the system 1, 1300 may be configured to generate and utilize metadata information including information such as a content identifier, a title, a duration, and a playlist field. The playlist field in some embodiments includes a playlist type, and a uniform resource locator (URL) for each playlist type. In some embodiments, each URL includes one or more of the following information: protocol (e.g., "http"), subdomain (e.g., "www"), domain_name (e.g., "abc"), top_level_domain (e.g., "com"), folder_name (e.g., "skysports"), playlist_type (e.g., "primary"), playlist_filename (e.g., "index"), and playlist_file_extension (e.g., "m3u8") with appropriate punctuation (e.g., periods (".") and forward slashes (e.g., "/")) therebetween. TABLE 1 depicts an example of metadata information for pre-match content of a soccer event.

TABLE 1

Metadata File Including URLs

ContentId: 12345
Title: "England vs. Italy pre-match"
Duration: 60 min
Playlist: {
{type = "primary", url = "http : // abc.com/ skysports/primary/index.m3u8"},
{type = "interview", url = "http : // abc.com/ skysports/interview/index.m3u8"},
{type = "crowd", url = "http : // abc.com/ skysports/crowd/index.m3u8"},
{type = "panel", url = "http : // abc.com/ skysports/panel/index.m3u8"}, TABLE 1-continued Metadata File Including URLs {type = "stats", url = "http : // abc.com/ skysports/stats/index.m3u8"},
{type = "ugc", url = "http : // abc.com/ skysports/ugc/index.m3u8"}
}

NOTE: In Table 1, to avoid inclusion of browser-executable code into the present specification, the URLs are shown with extra spaces between "http" and other parts of the URL that would be understood to be omitted in a live URL. It is to be understood that these URLs are merely exemplary and are not an attempt to incorporate subject matter by reference. It is to be further understood that these exemplary URLs would be provided in executable format in actual implementation.

In some embodiments, the metadata information is made available in a client device, which is leveraged to increase viewership and user interest.

Integrated User Interface with Secondary Feeds and Primary Feed

In one exemplary embodiment, a device is configured to display and play a primary feed without supplemental content (e.g., FIG. 10). As shown in FIG. 10, a display 1000 includes one or more of a main display area 1005 (e.g., a live feed of a soccer match), and a control bar 1010. The control bar 1010 includes one or more of a pause button 1015, a progress bar 1020, an indicator 1025 of a point of time corresponding to content displayed in the main display area 1005, a time stamp 1035, a settings button 1040, an audio control button 1045, and an expand/contract button 1050. If the content displayed in the main display area 1005 is not caught up with live, and/or if the content displayed in the main display area 1005 is buffering into memory, a buffered content bar 1030 indicates a portion past the indicator 1025 that has been stored into memory and is available for immediate viewing.

Upon detection of a triggering event, such as availability of one or more supplemental feeds, a device is configured to simultaneously display content from at least two of multiple exemplary feeds, examples of which are shown in FIGS. 1B, 2A to 2E, and 3A to 3E.

Figure 1B:
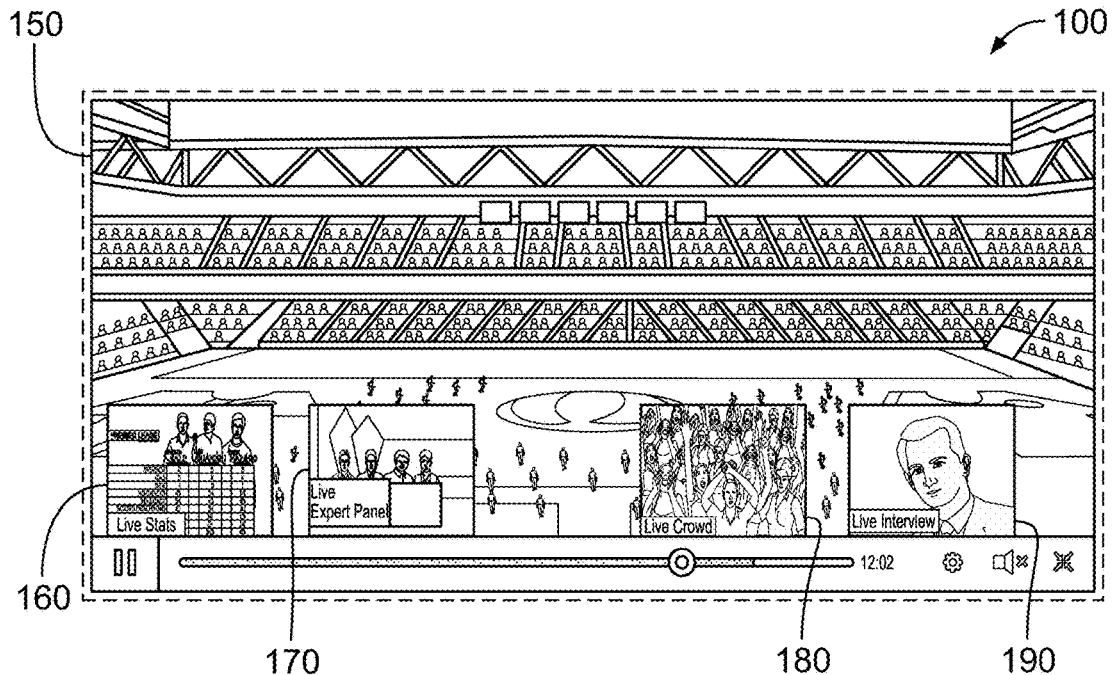
FIG. 1B depicts a display including four selectable secondary feeds integrated with a primary feed, in accordance with some embodiments of the disclosure.

FIG. 1B: Four Secondary Live Feeds Integrated with Primary Feed

As shown in FIG. 1B, display 100 includes an exemplary four secondary playlists simultaneously with a primary feed 150 in a single screen. Controls such as those disclosed herein with reference to FIG. 10 may be integrated into the user interface including, e.g., play/stop/pause control, a scrub bar, a time stamp/location indicator, a settings control, an audio control, and/or an enlarge/collapse button. The four secondary playlists include, in this example, a live statistics feed 160, a live expert panel feed 170, a live crowd feed 180, and a live interview feed 190.

The secondary playlists may appear for a predetermined amount of time, may appear in response to a user command, or may appear automatically. The display of FIG. 1B may change to any other disclosed display including, e.g., FIG. 10, after a predetermined amount of time. The four secondary playlists may be displayed horizontally as shown predominantly in a lower half of the single screen. The four secondary playlists may be shown predominantly or wholly in a lower third of the single screen. Any other suitable arrangement may be provided. The controls illustrated at the bottom of FIG. 1B may disappear after a predetermined time without activity, and, in response, the four secondary playlists may continue to appear, and/or shift to a different position on the screen so as to be less intrusive of the single screen. The four secondary playlists may disappear after a predetermined time without activity, and, in response, the controls continue to appear, and/or shift to a different position on the screen so as to be less intrusive of the single screen. Upon selection of the settings button (e.g., 1040), the user may select different configurations for the four secondary playlists. The four secondary playlists may be dynamically generated in a manner that is responsive to objects displayed in the single screen so as to avoid obstruction of objects determined to be of interest to the user.

It is noted that the labels shown in FIGS. 1B, 2A, 3A to 3E, and 4, e.g., "Live Stats" 165, "Live Expert Panel" 175, "Live Crowd" 185, "Live Interview," and the like, are merely exemplary and optional. In some embodiments, the labels may temporarily be superimposed over the respective feed as shown, and the labels may be removed from the display after a predetermined time. In some embodiments, the labels may appear until user selection.

One or more of the feeds 150, 160, 170, 180, 190 may be selectable by a user, resulting in generation of a different type of display. For example, selection of the selectable option corresponding with the live statistics feed 160 may result in full-screen display of the live statistics feed 160 as shown in FIG. 4. For example, selection of the selectable option corresponding with the primary feed 150 may result in full-screen display of the primary feed 150 as shown in FIG. 10. Throughout the disclosure, one or more of the labels referenced herein may be generated based on one or more of analysis of metadata associated with a content item, pre-configured labels, user preferences, content provider instructions, natural language processing, and the like.

Exemplary Use Case: Christopher, the Gareth Bale Welsh Team Superfan

In an exemplary embodiment, Christopher is a superfan of Gareth Bale, a Welsh soccer player who plays variously for Wales, the Tottenham Hotspur, and Real Madrid Club de Fútbol, depending on the event. Using his media guidance application, Christopher requests a live broadcast of a UEFA European Football Championship match between the Welsh National team and England (some images are from UEFA Euro 2016, but for purposes of this disclosure, it is to be understood the primary event is a live broadcast). The system 1, 1300 is configured to access metadata associated with Christopher, metadata associated with the media content item associated with UEFA Euro broadcast, metadata associated with other viewers of content related to soccer generally and the UEFA Euro tournament in particular, and metadata associated with Christopher's user profile. These forms of metadata are exemplary; other types of metadata may be included. The system 1, 1300 analyzes the metadata using an analytics tool of a predictive model 1200 described hereinbelow (FIG. 12). Without direct user input, the system 1, 1300 determines that Christopher has an above-average interest in the Welsh team and Gareth Bale.

The system 1, 1300 further determines that Christopher exhibits above-average engagement with expert panel discussion, statistics, and interviews. Based on the analysis, the system 1, 1300 determines a preferred content mix for Christopher including about 60% expert panel discussion, about 20% statistics, and about 10% interviews (see, e.g., FIG. 8 and related disclosures). In some embodiments, the system 1, 1300 determines the preferred content mix percentages based on an average viewing time Christopher spent in the past viewing soccer-related expert panel discussion, statistics, and interviews. In other embodiments, the system 1, 1300 determines the preferred content mix percentages based on user preferences input into the system 1, 1300. In still other embodiments, the system 1, 1300 determines the preferred content mix percentages based on an analysis of a cluster of users with similar demographic characteristics as Christopher. In some embodiments, the preferred content mix percentages are based on a combination of the methods described above.

In a picture-in-picture mode (e.g., FIG. 1B), Christopher is presented with a primary live stream 150 including a live shot of the pre-game show for the UEFA match. Superimposed over the primary live stream 150 are a live statistics stream 160, a live expert panel stream 170, a live crowd stream 180, and a live interviews stream 190, each including a user-selectable link configured to switch the primary stream to one of the secondary streams and/or completely replace the picture-in-picture mode with a full-screen display of the selected content. For example, a first click on a selectable link may switch the primary stream to the secondary stream, and a second click on the screen may switch the selected secondary stream to a full-screen mode. In some embodiments, throughout the match, the live statistics stream 160 always has live content available for selection. During the pre-match portion of the match, the live statistics stream 160 is based on historic data about the Welsh team, Gareth Bale, leaders of opposing team, and the like. During the match, the live statistics stream 150 switches to live statistics about the match displayed in the primary live stream 150. The live expert panel stream 170 may include live commentary throughout the match or segments at selected intervals. When the live expert panel stream 170 is not presenting live content, the system 1, 1300 is configured to recognize the unavailability of live content and exclude the presentation of the live expert panel stream 170 and/or replace the live expert panel stream 170 with other content. In some embodiments, the primary live stream 150 may automatically switch between presentation of the match and content determined to be of interest to Christopher. For example, during a break in action, the system 1, 1300 is configured to automatically switch the main display to expert panel discussion 60% of the time, statistics 20% of the time, interviews 10% of the time, and advertisements 10% of the time (consistent with FIG. 8). In some embodiments, even though Christopher has not historically shown an interest in live crowd content, the system 1, 1300 may be configured to present the live crowd stream 180 to Christopher in response to a determination that a cluster of users similar to Christopher demonstrate above-average engagement and interest in content such as the live crowd stream 180. Responsive to this determination, the system 1, 1300, automatically and dynamically adds the live crowd stream 180 to Christopher's options. Further, the percentages may be dynamically adjusted over time. For instance, the system 1, 1300 is configured to detect less engagement by Christopher with the expert panel stream 170 over time, and the percentage apportioned to the stream 170 is automatically adjusted on the fly. As a result, a dynamic and customized experience is presented. Christopher's enjoyment of the match is increased, he remains engaged in the content, and he consumes more advertisement content. As such, revenues for the content provider are increased.

FIGS. 2A to 2E: Grid Displays

As shown in FIG. 2A, in an exemplary embodiment, a display 200A includes the primary feed 150 and three secondary feeds 160, 170, 180. The secondary feeds are presented in a single screen 250 in a two-by-two grid. The grid may have fewer display areas, e.g., only two or three display areas, or additional columns and/or rows, e.g., three-by-two (e.g., FIGS. 2B to 2E), three-by-three, four-by-four, and the like. Other non-rectilinear presentations with or without unequally sized display areas and/or irregular display area shapes may be presented in any suitable combination. As in the example of FIG. 1B, one or more of the feeds 150, 160, 170, 180 may be selectable by a user, resulting in generation of a different type of display. For example, selection of the selectable option corresponding with the live statistics feed 160 may result in full-screen display of the live statistics feed 160 as shown in FIG. 4. For example, selection of the selectable option corresponding with the primary feed 150 may result in full-screen display of the primary feed 150 as shown in FIG. 10.

Returning to Christopher, based on the determination that his preferred mix includes about 60% expert panel discussion, about 20% statistics, and about 10% interviews (again, see FIG. 8), Christopher's grid is similar to that shown in FIG. 2A, except that in FIG. 2A, the live crowd stream 180 is provided instead of the live interviews stream 190. In some embodiments, for Christopher, an advertising stream replaces some or all streams 10% of the time.

For User 1 (see, e.g., FIG. 7 and related disclosure), based on the determination that User 1 prefers a mix including about 20% expert panel discussion, about 30% statistics, about 15% interviews, about 20% crowd view, about 5% for previous matches, and about 5% for user-generated content, with a remaining 10% for advertisements, the grid for User 1 is similar to that shown in FIG. 2A except that six or seven streams are presented to the user based on the distribution of FIG. 7. In other embodiments, the display for User 1 is similar to that shown in FIG. 1B except that six or seven streams are presented to the user based on the distribution of FIG. 7.

In embodiments, as shown in FIGS. 2B to 2E, different types of displays may be generated consistent with the spirit and scope of the present disclosure. For example, as shown in FIG. 2B, a display 200B includes six concurrent live feeds.

Exemplary Use Case: Josefina the Multitasker

In this example, based on an analysis of metadata, the system 1, 1300 determines that Josefina demonstrates an above-average interest and engagement with live content from a wide variety of content categories including sports, reality shows, weather, politics, the stock market, and general news. Josefina enjoys a presentation of content that gives her options to choose the content she wishes to enjoy live while maintaining an option to switch to other content of interest. The system 1, 1300 is configured to deliver to Josefina a first feed 111 displaying a live football game between the San Francisco 49ers and the Los Angeles Rams. The first feed 111 may include one or more labels with information determined to be related to the content being displayed. The first feed 111 may include a first label 113 including a live score (e.g., "SF 17 LAR 7") corresponding with the first feed 111. The first feed 111 may include a second label 115 including a category or genre label 115 (e.g., "SPORTS"). Additional labels and/or types of information may be displayed or omitted in each of the examples disclosed herein.

A second feed 121 displays a reality show, e.g., "Big Brother." The first label 113 of the second feed 121 may include information, e.g., "SHOWMANCE!" determined to be related to the content displayed in the second feed 121. The second feed 121 may include a second label 115 including a category or genre label (e.g., "REALITY") determined to be related to the content displayed in the second feed 121.

A third feed 131 displays a weather report, e.g., the 5 Live KTLA weather report. The first label 113 of the third feed 131 may include information, e.g., "SUNNY 65° F." determined to be related to the content displayed in the third feed 131. The third feed 131 may include a second label 115 including a category or genre label (e.g., "WEATHER") determined to be related to the content displayed in the third feed 131.

A fourth feed 141 displays a politics report, e.g., a map of the 2022 U.S. Senate races with color-coding depicting the party of the incumbent and where relatively darker shades indicate more secure seats according to party. In this example, Missouri, Alabama, Ohio, North Carolina, and Pennsylvania are safe for Republicans and shaded in dark red, and Vermont is safe for Democrats and shaded in dark blue. Also in this example, Alaska, Idaho, Utah, North Dakota, South Dakota, Kansas, Oklahoma, Iowa, Arkansas, Louisiana, Wisconsin, Indiana, Kentucky, Florida, and South Carolina are leaning Republican and shaded in light red. Further in this example, Hawaii, Washington, Oregon, California, Nevada, Arizona, Colorado, Illinois, Georgia, Maryland, New York, Connecticut, and New Hampshire are leaning Democratic and shaded in light blue. The rest of the states—i.e., Montana, Wyoming, New Mexico, Nebraska, Texas, Minnesota, Mississippi, Tennessee, Michigan, West Virginia, Virginia, Delaware, New Jersey, Massachusetts, Rhode Island, and Maine—do not have Senate seats up for election and are shaded gray. The first label 143 of the fourth feed 141 may include information, e.g., "SENATE 2022" determined to be related to the content displayed in the fourth feed 141. The fourth feed 141 may include a second label 145 including a category or genre label (e.g., "POLITICS") determined to be related to the content displayed in the fourth feed 141. The exemplary map of the fourth feed 141 may be dynamically generated by accessing information regarding polling in the respective states or included as part of the fourth feed 141 from a content provider.

A fifth feed 151 displays a stock market report, e.g., the current price of Tesla stock and the daily movement of the Tesla stock. In this example, the fifth feed 151 includes a live feed from the floor of the NASDAQ. The first label 143 of the fifth feed 151 may include information, e.g., "TSLA 891.14–14.52 (–1.60%)" determined to be related to the content displayed in the fifth feed 151 (i.e., e.g., Tesla's ticker symbol, "TSLA," Tesla's current price per share, "891.14," the point movement that day, "–14.52," and the percentage movement that day, "–1.60%"). The fifth feed 151 may include a second label 145 including a category or genre label (e.g., "STOCK MARKET") determined to be related to the content displayed in the fifth feed 151. The exemplary first label of the fifth feed 151 may be dynamically generated by accessing information regarding the stock market or as part of the fifth feed 151 from a content provider.

A sixth feed 161 displays a news report, e.g., an NBC News Special Report regarding the Coronavirus (COVID-19) epidemic. In this example, the sixth feed 161 includes a graphic from the content provider. The first label 143 of the sixth feed 161 may include information, e.g., "COVID: US CASES 75,755,637" determined to be related to the content displayed in the sixth feed 161. The sixth feed 161 may include a second label 145 including a category or genre label (e.g., "NEWS") determined to be related to the content displayed in the sixth feed 161. The exemplary first label 143 of the sixth feed 161 may be dynamically generated by accessing information regarding the COVID-19 epidemic (e.g., from the Centers for Disease Control and Prevention (CDC), the World Health Organization (WHO), the European Center for Disease Prevention and Control (ECDC), websites, news organizations, aggregators, and the like) or as part of the sixth feed 161 from a content provider.

The various feeds illustrated in FIG. 2B are merely exemplary. Other types of informational and audiovisual feeds may be implemented.

Josefina can simultaneously enjoy the game between San Francisco and Los Angeles without missing other information from the other displayed streams determined to be of interest to her. For example, during a slow period of the San Francisco-Los Angeles game, Josefina sees the formation of a Showmance on "Big Brother" on stream 121. Josefina can select a selectable option associated with stream 121 allowing her to quickly switch back and forth between "Big Brother" and the football game. As a result, a dynamic and customized experience is presented. Josefina's enjoyment of the live content is increased, she remains engaged in the content, and she consumes more advertisement content. As such, revenues for the content provider are increased. Although six streams are shown in FIG. 2B, any suitable number or arrangement of streams may be customized by the content provider, by Josefina herself, dynamically generated based on an analysis of metadata, and/or combined in any suitable combination.

For example, in another embodiment, as shown in FIG. 2C, upon selection of the first feed 111 in FIG. 2B, a display 200C is generated including the first feed 111, and the other five feeds are populated with content determined to be related to the first feed 111. In this example, the first feed 111 continues to display the football game between the San Francisco 49ers and the Los Angeles Rams. Feeds 121, 131, 141, 151, 161 switch to feeds of spectacular plays in the sport of football, e.g., incredible interceptions, one-handed catches, two-point conversions, walk-off game enders, and Hail Marys, respectively, with matching labels (e.g., 143) for each. In some embodiments, the type of content displayed in one or more of the feeds 121, 131, 141, 151, 161 may be determined to be a match of the play shown in the first feed 111. For example, an interception in the San Francisco versus Los Angeles game may trigger fetching of other notable interceptions in NFL history, other interceptions by the athlete determined to have made the interception in the first feed 111, and the like. The inclusion of six total feeds is merely exemplary. The display 200C may include only two feeds in a split screen fashion, a picture-in-picture arrangement, or the like.

For example, in another embodiment, as shown in FIG. 2D, upon selection of the first feed 111 in FIG. 2B or FIG. 2C, and in response to a determination that the user (e.g., Josefina) has a particular interest in the athlete (e.g., Deebo Samuel) displayed in the first feed 111, a display 200D is generated including the first feed 111, and the other five exemplary feeds are populated with content determined to be related to the first feed 111. In this example, the first feed 111 continues to display the football game between the San Francisco 49ers and the Los Angeles Rams. Feeds 121, 131, 141, 151, 161 switch to feeds of information about Deebo Samuel, the athlete determined to be of particular interest to the user viewing the first feed 111 and/or the subject of the media content item determined to be currently displayed. In this example, the feeds 121, 131, 141, 151, 161 include information about Deebo's performance in Super Bowl LIV (e.g., labeled "DEEBO IN SUPER BOWL LIV"), records (e.g., labeled "DEEBO'S RECORDS"), statistics (e.g., labeled "DEEBO'S STATS"), charitable work (e.g., labeled "DEEBO'S 'BE THE CHANGE' SCHOLARSHIP PROGRAM"), and college/university performances (e.g., labeled "DEEBO IN COLLEGE"), respectively, with first labels (e.g., 113, 143) including matching labels for each feed. In this example, the second labels (e.g., 145) of the feeds 121, 131, 141, 151, 161 include information about the date or dates corresponding with each feed. As a result, Josefina, a fan of Deebo Samuels, is presented with supplemental content of particular interest to her, her enjoyment, engagement, and viewership increases, and revenues are increased.

For example, in another embodiment, as shown in FIG. 2E, upon selection of the second feed 121 in FIG. 2D, and in response to a determination that the user has a particular interest in either or both teams (e.g., San Francisco and/or Kansas City) displayed in the first feed 111, a display 200E is generated. Alternatively, the system 1, 1300 is configured to associate the selection of the second feed 121 with an interest in content related to subjects displayed in the first feed 111. In this example, the second feed 121 of FIG. 2D is moved to a first position in FIG. 2E such that the second feed 121 of FIG. 2D replaces the first feed 111 of FIG. 2E. In this example, the feeds 121, 131, 141, 151, 161 include information about past matches between San Francisco and Kansas City including, e.g., first labels (e.g., 113, 143) including the corresponding final score (e.g., "SF 20 @ KC 31" and the like), and second labels (e.g., 115, 145) including the corresponding date of the contest (e.g., "Feb. 2, 2020"). The types of displays that are generated may include a mixture of one or more of the exemplary feeds in the displays 200C, 200D, 200E shown in FIGS. 2C, 2D, and 2E in any suitable combination. In the example of FIG. 2E, the last six matchups between the San Francisco 49ers and the Kansas City Chiefs are presented in feeds 111, 121, 131, 141, 151, and 161, respectively. The types of displays that are generated may be determined based on an analysis of user preferences, a user profile, metadata of the content item, and a viewing history of the user, or the like. Other combinations of features are contemplated with functions and displays determined to result in improvement of user satisfaction, user retention, increased viewership, and the like. The displays 200C, 200D, 200E are not necessarily triggered by a prior selection and may be generated as stand-alone displays responsive to other appropriate requests or determinations.

As shown in FIGS. 3A to 3E, in an exemplary embodiment, the primary feed and secondary feed are presented on different devices. Although five devices are shown in FIGS. 3A to 3E, any suitable number of displays or types of display may be utilized. In some embodiments, a combination of one or more of the feeds of FIG. 1, the grid embodiment of FIG. 2, and the multiple displays of FIGS. 3A to 3E, may be provided. In the example of FIGS. 3A to 3E, a smart television 350 is configured to display the primary feed 150, a laptop 360 is configured to display the live statistics feed 160, a smartphone 390 is configured to display the interview feed 190, a tablet 170 is configured to display the live expert panel feed 370, and a computer monitor 380 is configured to display the live crowd feed 380. In some embodiments, in response to user selection of one of the feeds in FIGS. 1B and 2A, a determination (e.g., 59 in FIG. 1A, 1440 in FIG. 14E) is made whether an additional display device is available, and the user is prompted to select one or more of the additional display devices for the selected feed. In other embodiments, after availability of additional displays is already determined, after user selection of one of the feeds in FIGS. 1B and 2A, the selected feed is automatically sent to one of the additional displays. In some embodiments, one device is configured to locally cast 79, 89 (FIG. 1A) content from the one device to one or more additional available devices. In some embodiments, a local or cloud-based storage 5, 17 of FIG. 1A is configured to cast content the one device and/or to the one or more additional available devices.

As shown in FIG. 4, in an exemplary embodiment, in response to selection of the first of the four selectable links shown in FIG. 1, or selection of the second of the four selectable links shown in FIG. 2, display of the statistics feed can replace the primary feed.

FIG. 4: Full Screen Display of Secondary Feed

The user interface is configured in some embodiments with user-selectable options corresponding to each secondary feed. For example, as shown in FIG. 4, if the user selects any of the secondary live feeds, the selected playlist is played in the primary screen (replacing the primary feed), and the primary feed may be moved to a secondary position. The selected playlist may be played on a secondary screen, which may be part of a second device, and/or as a picture-in-picture (PiP).

Since the secondary playlist may be discontinuous, the user interface is configured in some embodiments to provide the secondary playlist when a live feed is available at any given moment in time. In some embodiments, the system 1, 1300 is configured to play the secondary playlist until an EXT-X-DISCONTINUITY tag or the like is received. Upon receipt of the EXT-X-DISCONTINUITY tag, the system 1, 1300 is configured in some embodiments to automatically switch back to a primary playlist or another secondary playlist with available content.

As noted, for example, in Pantos, Roger, and William May, "HTTP live streaming, RFC 8216," 2017 (hereinafter "RFC 8216"), the EXT-X-DISCONTINUITY tag (format: #EXT-X-DISCONTINUITY) indicates a discontinuity between a media segment that follows the tag and the one that preceded the tag. Within the context of RFC 8216, as a rule, the EXT-X-DISCONTINUITY tag must be present if there is a change in any of the following characteristics: file format; number, type, and identifiers of tracks; and timestamp sequence. Within the context of RFC 8216, as a rule, the EXT-X-DISCONTINUITY tag should be present if there is a change in any of the following characteristics: encoding parameters; and encoding sequence.

Dynamic Generation of User Interface and/or Content Feed Based on User Interest

In one exemplary embodiment, to increase an interest level of a user and to provide personalized feeds of interest to the user, the system 1, 1300 is configured to access a user profile and/or metadata. The user profile includes preference information. For example, in the context of a sporting event, the user profile includes information of viewing history based on content type or segment type. For example, based on the user's viewing history and metadata associated with previously presented content, the system 1, 1300 is configured to determine that a user has a preference for statistics, interviews, and crowd celebrations, or that a client device is delivering these types of content at a frequency greater or less than a predetermined standard (e.g., more or less frequently than average).

In some embodiments, the system 1, 1300 is configured to filter the segment types. The filtering may be based on a determination of a preference of a given user for each segment type. The filtering may be based on a determination of a preference for content of each segment type to be played on a given client device. In some embodiments, the system 1, 1300 is configured to rank each of the filtered types based on metadata, which is based on the user profile. For example, in one exemplary implementation, the system 1, 1300 is configured to generate display of a top-ranked secondary feed. The system 1, 1300 may be configured to display the top-ranked secondary feed until a contrary signal is sent. The contrary signal may be the EXT-X-DISCONTINUITY tag. In response to receiving the contrary signal (e.g., the EXT-X-DISCONTINUITY tag), the system 1, 1300 is configured in some embodiments to automatically switch to a second highest ranked secondary feed, a third highest ranked secondary feed, and so on. If no secondary feed is available, the system 1, 1300 is configured in some embodiments to revert to the primary feed. Thus, the system 1, 1300 is configured to display interesting segments to the user automatically and without user intervention.

For example, the system 1, 1300 has determined, based on the user profile, that a given user is most interested in statistics, then in interviews, and then in crowd celebrations. The statistics feed is given first priority, the interviews feed is given second priority, and the crowd celebrations feed is given third priority. The system 1, 1300 has also determined that an incidence rate of the user viewing expert panel discussions or UGC does not satisfy a predetermined standard, e.g., above a predetermined incidence rate and/or a viewing time for a given content category less than a predetermined amount of time. (For example, the system 1, 1300 may determine that more than 95% of a duration of a given event, the user watches expert panel discussions or UGC for less than one minute each.) The system 1, 1300 is configured to automatically (without direct user intervention) present otherwise discontinuous feeds in a continuous manner by automatically switching between content types based on the determinations noted herein. For example, for the exemplary user described above, the system 1, 1300 is configured to present to the user an integrated feed including portions of the statistics, interviews, and crowd celebrations feeds (e.g., FIG. 5).

FIG. 5: Integration of Three Secondary Live Feeds

Referencing a timeline 500 in the example of FIG. 5, the system 1, 1300 is further configured to select for primary display one of the secondary feeds based on an availability of content. For example, statistics and crowd celebrations (e.g., 515 and 525, respectively) may be continuously available in their respective feeds, whereas interviews (e.g., 530) are only available when a particular player or coach is being interviewed by a reporter. The system 1, 1300 may be configured to present interviews in an interview feed 530 as they become available, and after each interview ends, a statistics feed 515 may be presented as a default unless a crowd celebration feed 525 satisfies a predetermined standard. For example, crowd noise in decibels may be received from a decibel meter, and the crowd feed 525 may be selected when the crowd noise exceeds a predetermined number of decibels. In another implementation, crowd motion may be received from a crowd motion analysis system, and the crowd feed 525 may be selected when the crowd motion analysis system satisfies a predetermined standard indicative of abnormal crowd behavior, e.g., the system may be pre-configured to identify crowd motion (e.g., fans jumping exuberantly and/or flags or signs waving) indicative of a score in a sporting event. In other embodiments or in combination with the embodiments disclosed above, metadata of the content item may indicate the score of the match.

Dynamic Determination of Proportion for Display of Each Segment Type Based on User Profile and/or Viewing History In one exemplary embodiment, the system 1, 1300 is configured to calculate a percentage and/or duration of each segment type to be displayed via the client device. This is calculated based on user profile and past viewing history. By doing so, each user would get to see more of what they like instead of same feed coming from server.

FIG. 6: Static Duration Proportion by Segment Type for the Primary Feed

The system 1, 1300 is configured to deliver the primary feed, which is the same for all users. The primary feed has, in this example, a static or predetermined proportion of content by content type as shown, for example, in FIG. 6, e.g., a one-hour event is provided having 100 total minutes of content, which is divided into seven content types, e.g., 40 minutes (40%) of expert panel discussion 620, 10 minutes (10%) of advertisements 640, five minutes (5%) of statistics 615, five minutes (5%) of interviews with players and coaches 630, 10 minutes (10%) of crowd gathering 625, 10 minutes (10%) of highlights from a previous match 650, and 20 minutes (20%) of UGC 610.

FIG. 7: Dynamic Duration Proportion by Segment Type for User 1

Individual users may have dynamic or customized proportions of content based on the user profile or viewing history. For example, based on an analysis of the user profile and/or the viewing history, the system 1, 1300 determines that User 1 is most interested in statistics. The system 1, 1300 determines that User 1 has a second highest interest level, which is less than the highest interest level, and that User 1 has approximately equal interest in expert panels and crowd views. The system 1, 1300 determines that the user has a third highest interest level for interviews, which is less than the second highest interest level for expert panels and crowd views, and a fourth highest interest level, which is less than the third highest interest level, of approximately equal interest in previous matches and UGC. A category such as advertisements may be prescribed a predetermined interest by a content provider. In the example of FIG. 7, based on an analysis of the user profile and/or the viewing history of User 1, the system 1, 1300 apportions 30% of content to statistics 715, 20% to each of expert panels 720 and crowd views 725, 15% to interviews 730, 10% to advertisements 740, and 5% to each of previous matches 750 and UGC 710.

FIG. 8: Dynamic Duration Proportion by Segment Type for User 2

In the example of FIG. 8, based on an analysis of the user profile and/or the viewing history of User 2, the system 1, 1300 apportions 60% to expert panels 820, 20% of content to statistics 815, 10% to interviews 830, and 10% to advertisements 840. Other categories are not included in the dynamically generated stream for User 2. That is, based on the analysis, the system 1, 1300 is configured to determine that User 2 has little or no interest in previous matches or UGC. Thus, the feed represented by FIG. 8 is of significantly more interest to User 2 than to User 1 and vice-versa.

The system 1, 1300 may apportion percentages based on past viewing times of the categories of content, received input from a user indicating preferences for categories of content, an analysis of user profiles determined to be likely to be similar to that of a given user, and the like. The system 1, 1300 may employ rounding when an interest level or prevalence of viewing is within a predetermined percentage of set increments such as 5% or 10%. Although the examples are provided in terms of percentages, units of time or other units may be the basis for the apportionment. With live events, a total duration of the event may only be approximated in advance, and the system 1, 1300 is configured, in some embodiments, to dynamically modify the apportionment upon a determination that a match is likely to be extended beyond, e.g., an original expected end time (e.g., overtime in football, extra innings in baseball, and the like).

Thus, with these determined calculations, the system 1, 1300 is configured to manage multiple otherwise discontinuous and separate secondary feeds, and to switch between the feeds based on the calculations.

Clustering

In one exemplary embodiment, instead of providing a single primary feed from a server, which is managed by an editor at the server side, multiple primary feeds are provided and targeted for one or more clusters of viewers.

For example, in the context of a sporting event, before the pre-match, the system 1, 1300 is configured to determine a list of possible users who are likely to tune into or select the content for viewing. The system 1, 1300 is configured to receive as input user profiles of all potential viewers based on segment types determined to be likely to be watched. In some embodiments, the system 1, 1300 is configured to apply machine learning techniques in order to group viewers into different clusters.

In some embodiments, the system 1, 1300 is configured to identify a plurality of clusters based on determination of interest in segment types. For example, four clusters of viewers may be determined, in which the first cluster includes viewers determined to be most interested in expert panels, second most interested in statistics, and third most interested in interviews, which is expressed below as "expert panel>stats>interviews." The exemplary clusters are as follows:

cluster 1: expert panel>stats>interviews;
cluster 2: fans celebration>UGC>statistics;
cluster 3: important match events or highlights; and
cluster 4: statistics>predictions>expert panel>interviews.

Each segment type may be weighted. For example, within cluster 2, the interest in statistics may be limited to a predetermined length of time or percentage of the expected or actual total time of the event.

Based on the identified clusters, each with a priority order for content segments and an optional weight, the system 1, 1300 is configured to generate for display at the server end, in this example, four different types of playlists or feeds. In some embodiments, an editor may contribute to the generation of each playlist for each cluster. In some embodiments, the system 1, 1300 may deliver a framework for each cluster, and the editor may modify the framework.

In some embodiments, in response to a request from a client device requesting a playlist for a given event, the system 1, 1300 is configured to determine a cluster having a highest fit for the requesting user and transmitting to the client device the playlist appropriate for the highest fit cluster. Thus, the system 1, 1300 supports multiple playlists at the server side and provides an improved experience at the client side.

In some embodiments, the system 1, 1300 is configured to determine if there is sufficient content from a given category, e.g., if there is expert panel content sufficient to meet 60% of the personalization goal for a given user, then the system 1, 1300 will provide such content; otherwise, the system 1, 1300 is configured to fetch related content, e.g., from a live streaming feed of a fan, to fill the gap in the 60% goal for expert panel content.

Virtual Channels

In one exemplary embodiment, the system 1, 1300 is configured to automatically generate a virtual channel. The virtual channel may be configured for a live event. The virtual channel (e.g., a stream with a unique URL) features secondary content determined to be related to a main event, including UGC. The virtual channel allows users and content producers to upload content for processing (e.g., scanned to screen out inappropriate content, then transcoded, and the like) and delivery to viewers that request the supplemental feed. Content may be uploaded from video-sharing and social media platforms, such as YouTube or Facebook. The uploaded content is categorized and presented in such a way that is relevant to real-time events occurring in the live event (e.g., a sports game), when applicable. For example, videos determined to be related to crowd reactions or celebration are featured in response to a signal indicating a score or a notable play. For instance, the system 1, 1300 may be configured to detect a score, or a notable play, based on one or more of on-screen information, object analysis, audio analysis, entry of a signal, monitoring of social media, and the like.

It might be impossible to broadcast or stream all the secondary content received from the various users and sources. In some embodiments, a selection system is provided to automatically select content to include in the secondary channel. In one embodiment, the secondary channel features content based on location. Location information allows businesses (e.g., a sports bar) to direct selected content to users located in a certain location. For example, a sports bar called "Seattle's Pub" might upload a video captured of the patrons' reaction during an exciting football play or a touchdown by the Seattle Seahawks or Washington University Huskies. The publisher or content owner can decorate the video such that, for example, one or more frames includes an image or video of the sports bar. Such video can be tagged as "celebration" with a location of "Seattle" and/or "Washington." In some embodiments, the tagged video is shown in a virtual channel associated with Seattle, all or a portion of Washington state, a geographic area corresponding to a relatively high percentage of fans of the subject of the live event, the Seahawks, and/or the Huskies, as appropriate.

In one embodiment, some or all the publishers that can upload content to the channel are verified merchants or advertisers and have the appropriate credentials to push content for delivery. Such videos are tagged as "verified" and automatically given a higher score than videos uploaded by unverified users.

In some embodiments, the secondary channel is configured in a manner similar to a linear channel in the sense that content is featured continuously during the live event. The virtual channel is configured to accept content uploaded by users. The virtual channel may be configured to search for and insert content determined to be relevant. The insertion of content may be performed in response to a state when no suitable user-generated content is available. For example, a content selection system is configured to present videos determined to be related to the event. The related videos include replays of a specific touchdown or remarkable play. Similarly, in some embodiments, the system 1, 1300 is configured to deliver clips from previous games of content that is like or similar to a recent event that took place in the live game. The clips from previous games can be categorized by content or name in a manner that permits near instantaneous delivery. For example, a throw that was intercepted at the goal line in the real, live, or current game triggers a search for a video that also depicts a throw by the same player that also resulted in an interception at the goal line, and/or an interception by the same defender, and or an interception of note from another team.

In another embodiment, a celebration feed for the live event features celebration videos received from all locations. Thus, content featured on the virtual channel can be location-based or topic-based. Similarly, other topic-based feeds, such as a statistics feed, can be created.

In one embodiment, verified users and experts in each topic are assigned the role of commentators during the event and/or during certain segments. For example, a user skilled in explaining National Football League (NFL) plays and/or rules provides commentary on the current content that is streamed on one of the secondary channels. Unlike a service like Twitch where users sign in and broadcast themselves (generally, speaking about a subject), and users sign in to hear the broadcasters speak, the system 1, 1300, in some embodiments, is configured to verify a given user to talk about the event featured on the primary channel or a topic of one or more of the virtual channels.

In one embodiment, advertisements (e.g., national advertisements) playing on the primary channel are the same advertisements that are presented to users watching one of the secondary channels. For example, users of the system 1, 1300 may select one of the secondary virtual channels during breaks or halftimes, and national advertisements may be persistent throughout all channels. Alternatively, the secondary channel functions as a secondary venue for presentation of advertisements relevant to users, e.g., local advertisements associated with local businesses and merchants.

Due to content licensing, a virtual channel might not be created for every event. Therefore, in some embodiments, the system 1, 1300 only creates a virtual channel (i.e., a stream with a URL that users can use to retrieve and consume content) based on entitlement rights associated with the event. In one embodiment, the secondary channel can be created for events that are blacked out (e.g., baseball and football games) if licensing rights allow. The creation of the virtual channel can result in updating of an electronic program guide (EPG) to indicate that the live event has an associated virtual channel. Since multiple feeds can be created for an event (as discussed herein), then only the appropriate feed is shown in the EPG (e.g., based on a subscriber's location).

In some embodiments, the content of the virtual channel is made available on-demand for at least a period to allow fans and viewers to watch the content after the game. The content is chaptered in some embodiments to allow viewers to consume parts of interest.

In one embodiment, the user subscribes to sub-events in the pre-game show. The system 1, 1300 is configured to provide an indication of availability of a secondary feed on the primary screen in response to a determination of development of content, such as provision of a new feed associated with a sub-event. For example, a sub-event is a crowd gathering at a specific location, and the gathering was featured during the pre-game show. The streaming service is configured to provide viewers with an option to subscribe to the sub-events that are likely to have secondary feeds available after they are featured in the pre-game show. The source of such secondary content triggers creation of a corresponding virtual channel.

Secondary Channels for Significant Events in a Sporting Event

In some embodiments, the system 1, 1300 is configured to monitor for and present options to review historic examples of one of the following remarkable events in sport: one or more of, in football, an interception, a one-handed catch, a legal trick play, a two-point conversion, a Hail Mary, a last second field goal; in baseball, a perfect game, a no hitter, a double play, a triple play, a stolen base, a walk-off home run; in hockey, a hat trick, a short-handed goal, a power play goal; in basketball, a slam dunk, a buzzer beater; in soccer, a bicycle kick, a penalty kick; in golf, a hole-in-one, an eagle; in bowling, a three-hundred score, conversion of a 7-10 split, a perfect score in a scored sport, a perfect 10 in gymnastics, a record-breaking performance in a sport, a photo finish, a winning play or score as time runs out, and the like.

Secondary Channels for Significant Events in a Reality Show

The system 1, 1300 is configured to employ the above concept from sports to other types of events. For instance, in a reality show, the system 1, 1300 is configured to present secondary feeds with content from past seasons of the reality show based on a trigger unique to the show. Many reality shows develop terminology unique to the show or genre. For example, the reality show "Big Brother" frequently includes memorable events each season such as alliances, showmances, head of household (HOH) designation, back-dooring, being put on the block, designation as a comp beast (i.e., a player that frequently wins physical competitions as opposed to mental challenges), getting blood on the hands (i.e., a player that openly targets another player for elimination and is successful to the ire of another player), appearance of the Zingbot, and the like. The system 1, 1300, in response to detecting such remarkable events, is configured to configure a secondary channel including such content from previously broadcast content. Referring to an example from another reality show, "Survivor," the system 1, 1300 is configured to monitor for use of a hidden immunity idol during a live show, which triggers a secondary channel with related content, e.g., a segment highlighting the best surprise uses of the hidden immunity idol from previously broadcast content.

Secondary Channels for Significant Events in a Live Show

The system 1, 1300 is configured to employ the above concepts from sports and reality shows to any other type of event. For example, live broadcasts such as weather reporting (especially during disasters such as hurricanes headed for a populated area), political events (live election results), stock market reporting, general news reporting, breaking news reporting, and the like have developed certain terminologies and contexts unique to each type of broadcast. The system 1, 1300 is configured in some embodiments to deliver secondary or virtual feeds relating one or more subjects of the live content (e.g., made available on the primary feed) to previously broadcast content. For example, during live reporting of election results, one or more secondary channels may be provisioned to include past speeches by a candidate, statistics about the election, polling leading up to the election, maps and charts relating to statistics and polling, exit polling, expert analysis, live feeds (e.g., from polling places, election headquarters for each candidate, and the "spin room"), reactions from individuals or viewer groups, spontaneous crowds, and the like.

The present techniques are applicable to delivery of content including a primary subject for presentation via the primary feed, stream, or channel, which may be a traditionally edited presentation, and secondary related content, which may be discontinuous in nature, for presentation via one or more secondary or virtual feeds, streams, or channels. In each instance described herein, in some embodiments, the secondary channel may stand alone without presentation of the primary channel, and one or more features of the secondary channel may be incorporated without limitation into a single channel of delivery.

Predictive Model

Throughout the present disclosure, determinations, predictions, likelihoods, user interest, relatedness, and the like may be determined with one or more predictive models. For example, FIG. 12 depicts a predictive model, which performs analysis based on one or more of hard rules, learning rules, hard models, learning models, usage data, load data, analytics of the same, metadata, profile information, and the like. A prediction process 1200 includes a predictive model 1250 in some embodiments. The predictive model 1250 receives as input various forms of data about one, more or all the users, media content items, devices, and data described in the present disclosure. The predictive model 1250 performs analysis based on one or more of hard rules, learning rules, hard models, learning models, usage data, load data, analytics of the same, metadata, profile information, and the like. The predictive model 1250 outputs one or more predictions of a future state of any of the devices described in the present disclosure. A load-increasing event may be determined by load-balancing techniques, e.g., least connection, least bandwidth, round robin, server response time, weighted versions of the same, resource-based techniques, and address hashing. The predictive model 1250 is based on input including one or more of a hard rule 1205, a user-defined rule 1210, a rule defined by a content provider 1215, a hard model 1220, and a learning model 1225.

The predictive model 1250 receives as input usage data 1230. The predictive model 1250 is based on one or more of a usage pattern of the user or media device, a usage pattern of the requesting media device, a usage pattern of the media content item, a usage pattern of the communication system or network, a usage pattern of the profile, and a usage pattern of the currently streaming media device.

The predictive model 1250 receives as input load-balancing data 1235. The predictive model 1250 is based on one or more of load data of the display device, load data of the requesting media device, load data of the media content item, load data of the communication system or network, load data of the profile, and load data of the currently streaming media device.

The predictive model 1250 receives as input metadata 1240. The predictive model 1250 is based on one or more of metadata of the streaming service, metadata of the requesting media device, metadata of the media content item, metadata of the communication system or network, metadata of the profile, and metadata of the currently streaming media device. The metadata may include information of the type represented in the media device manifest.

In some embodiments, the predictive model 1250 is trained with data. The training data is developed in some embodiments using one or more data techniques including but not limited to data selection, data sourcing, and data synthesis. The predictive model 1250 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 1250 is trained in some embodiments with one or more machine learning approaches including but not limited to supervised learning, unsupervised learning, semi-supervised learning, reinforcement learning, and dimensionality reduction. The predictive model 1250 in some embodiments includes regression analysis including analysis of variance (ANOVA), linear regression, logistic regression, ridge regression, and/or time series. The predictive model 1250 in some embodiments includes classification analysis including decision trees and/or neural networks. In FIG. 12, a depiction of a multi-layer neural network is provided as a non-limiting, exemplary predictive model 1250, the exemplary neural network including an input layer (left side), three hidden layers (middle), and an output layer (right side) with 32 neurons and 192 edges, which is intended to be illustrative, not limiting. In some embodiments, the predictive model 1250 is based on data engineering and/or modeling techniques. The data engineering techniques include exploration, cleaning, normalizing, feature engineering, and scaling. The modeling techniques include model selection, training, evaluation, and tuning. The predictive model 1250 is operationalized using registration, deployment, monitoring, and/or retraining techniques.

In some embodiments, the predictive model 1250 is configured to output a prediction 1281, and/or a future state 1283, and/or a determination, a prediction, a likelihood, a level of user interestedness, relatedness 1285, and the like.

In some embodiments, the predictive model 1250 is configured to output the prediction 1281, and/or the future state 1283, and/or the determination, a prediction, a likelihood, a level of user interestedness, relatedness 1285, and the like. The prediction 1281, and/or the future state 1283, and/or the determination, a prediction, a likelihood, a level of user interestedness, relatedness 1285, and the like, may concern one or more of, e.g., the system 1 of FIG. 1A; 1300 of FIG. 13; the server 2, the communication system 3, the streaming service 5, the main stream 7, the sub stream 11, the sub stream 97, all of FIG. 1A; the media device 350, 360, 370, 380, 390, all of FIGS. 3A-E; the local memory 17 of FIG. 1A; any of the systems and components of the system 1300 (FIG. 13), a streaming service 1255, a requesting media device 1260, a media content item 1265, a communication system or network 1270, a streaming subscription 1275, a currently streaming media device 1280, all of FIG. 12; and the like.

In some embodiments, the system 1, 1300 is configured to determine whether the prediction 1281, and/or the future state 1283, and/or the determination, a prediction, a likelihood, a level of user interestedness, relatedness 1285, and the like, satisfies a predetermined standard 1290. Based on whether the predetermined standard is satisfied 1290, a signal is outputted such as OK/Not OK, Go/No Go, Yes/No, or the like.

The system 1, 1300 and the predictive model 1250 may incorporate one or more of the features, systems, and methods disclosed in one or more of U.S. Pat. No. 8,732,737 to Kalmes et al., titled "GEOGRAPHIC CONTEXT WEIGHTED CONTENT RECOMMENDATION"; U.S. Pat. No. 8,881,209 to Kalmes et al., titled "FEEDBACK LOOP CONTENT RECOMMENDATION"; U.S. Pat. No. 9,774,911 to Thomas et al., titled "METHODS AND SYSTEMS FOR AUTOMATICALLY EVALUATING AN AUDIO DESCRIPTION TRACK OF A MEDIA ASSET"; U.S. Patent Application Publication No. 2019/0026776 to Campbell et al., titled "SYSTEMS AND METHODS FOR DEDUCING USER INFORMATION FROM INPUT DEVICE BEHAVIOR"; and U.S. Patent Application Publication No. 2020/0074321 to Chungapalli et al., titled "METHODS AND SYSTEMS FOR USING MACHINE-LEARNING EXTRACTS AND SEMANTIC GRAPHS TO CREATE STRUCTURED DATA TO DRIVE SEARCH, RECOMMENDATION, AND DISCOVERY," each of which is incorporated by reference herein in its entirety.

Communication System

The system 1, 1300 for delivery of media content includes delivery of the media content from a content provider to a media device through a communication system or network 1306 (FIG. 13). The system 1, 1300 includes control circuitry 1334. The control circuitry 1334 is configured to perform one, more, or all the features of the methods referenced herein in any suitable combination.

A non-transitory, computer-readable medium having non-transitory, computer-readable instructions encoded thereon is provided. The non-transitory, computer-readable medium is provided for controlling delivery of media content from a content provider to a media device, through a communication system or network 1306. The instructions, when executed by control circuitry 1334, may cause the control circuitry 1334 to perform one, more, or all the features referenced herein of the methods of FIGS. 1A, 12, 14A to 14G, and 15 in any suitable combination.

A device is configured for controlling delivery of media content. The device includes means for performing one, more, or all the features referenced herein of the methods of FIGS. 1A, 12, 14A to 14G, and 15 in any suitable combination. The device is one of a server, a smartphone, a tablet, a network-connected computer, and any other type of user equipment, media device, and computing device.

FIG. 13 depicts a block diagram representing exemplary media content delivery control system 1300, in accordance with some embodiments. The system is shown to include computing device 1302, server 1304, and a communication network 1306. It is understood that while a single instance of a component may be shown and described relative to FIG. 13, additional instances of the component may be employed. For example, server 1304 may include, or may be incorporated in, more than one server. Similarly, communication network 1306 may include, or may be incorporated in, more than one communication network. Server 1304 is shown communicatively coupled to computing device 1302 through communication network 1306. While not shown in FIG. 13, server 1304 may be directly communicatively coupled to computing device 1302, for example, in a system absent or bypassing communication network 1306.

Communication network 1306 may include one or more network systems, such as, without limitation, the Internet, LAN, Wi-Fi, or other network systems suitable for audio processing applications. In some embodiments, the system of FIG. 13 excludes server 1304, and functionality that would otherwise be implemented by server 1304 is instead implemented by other components of the system depicted by FIG. 13, such as one or more components of communication network 1306. In still other embodiments, server 1304 works in conjunction with one or more components of communication network 1306 to implement certain functionality described herein in a distributed or cooperative manner. Similarly, in some embodiments, the system depicted by FIG. 13 excludes computing device 1302, and functionality that would otherwise be implemented by computing device 1302 is instead implemented by other components of the system depicted by FIG. 13, such as one or more components of communication network 1306 or server 1304 or a combination of the same. In other embodiments, computing device 1302 works in conjunction with one or more components of communication network 1306 or server 1304 to implement certain functionality described herein in a distributed or cooperative manner.

Computing device 1302 includes control circuitry 1308, display 1310 and input/output (I/O) circuitry 1312. Control circuitry 1308 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 1308 in turn includes communication circuitry 1326, storage 1322 and processing circuitry 1318. Either of control circuitry 1308 and 1334 may be utilized to execute or perform any or all the processes or steps depicted in FIGS. 1A, 12, 14A to 14G, and 15, or any combination of steps thereof (e.g., as enabled by processing circuitries 1318 and 1336, respectively).

In addition to control circuitry 1308 and 1334, computing device 1302 and server 1304 may each include storage (storage 1322, and storage 1338, respectively). Each of storages 1322 and 1338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1322 and 1338 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 1322 and 1338 or instead of storages 1322 and 1338. In some embodiments, a user profile and messages corresponding to a chain of communication may be stored in one or more of storages 1322 and 1338. Each of storages 1322 and 1338 may be utilized to stored commands on behalf of the QSA, for example, such that when each of processing circuitries 1318 and 1336, respectively, are prompted through control circuitries 1308 and 1334, respectively, either of processing circuitries 1318 or 1336 may execute any of the processes and examples depicted in FIGS. 1A, 12, 14A to 14G, and 15, or any combination of steps thereof.

In some embodiments, control circuitry 1308 and/or 1334 executes instructions for an application stored in memory (e.g., storage 1322 and/or storage 1338). Specifically, control circuitry 1308 and/or 1334 may be instructed by the application to perform the functions discussed herein. In some embodiments, any action performed by control circuitry 1308 and/or 1334 may be based on instructions received from the application. For example, the application may be implemented as software or a set of and/or one or more executable instructions that may be stored in storage 1322 and/or 1338 and executed by control circuitry 1308 and/or 1334. In some embodiments, the application may be a client/server application where only a client application resides on computing device 1302, and a server application resides on server 1304.

The application may be implemented using any suitable architecture. For example, it may be a stand-alone application wholly implemented on computing device 1302. In such an approach, instructions for the application are stored locally (e.g., in storage 1322), and data for use by the application is downloaded on a periodic basis (e.g., from an out-of-band feed, from an Internet resource, or using another suitable approach). Control circuitry 1308 may retrieve instructions for the application from storage 1322 and process the instructions to perform the functionality described herein. Based on the processed instructions, control circuitry 1308 may determine a type of action to perform in response to input received from I/O circuitry 1312 or from communication network 1306.

In client/server-based embodiments, control circuitry 1308 may include communication circuitry suitable for communicating with an application server (e.g., server 1304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1306). In another example of a client/server-based application, control circuitry 1308 runs a web browser that interprets web pages provided by a remote server (e.g., server 1304). For example, the remote server may store the instructions for the application in a storage device.

The remote server may process the stored instructions using circuitry (e.g., control circuitry 1334) and/or generate displays. Computing device 1302 may receive the displays generated by the remote server and may display the content of the displays locally via display 1310. For example, display 1310 may be utilized to present a string of characters corresponding to suggestions as shown in FIGS. 1B, 2A to 2E, 3A to 3E, 4, and 10. This way, the processing of the instructions is performed remotely (e.g., by server 1304) while the resulting displays, such as the display windows described elsewhere herein, are provided locally on computing device 1304. Computing device 1302 may receive inputs from the user via input/output circuitry 1312 and transmit those inputs to the remote server for processing and generating the corresponding displays.

Alternatively, computing device 1302 may receive inputs from the user via input/output circuitry 1312 and process and display the received inputs locally, by control circuitry 1308 and display 1310, respectively. For example, input/output circuitry 1312 may correspond to a keyboard and/or a set of and/or one or more speakers/microphones which are used to receive user inputs (e.g., input as displayed in a search bar or a display of FIG. 13 on a computing device). Input/output circuitry 1312 may also correspond to a communication link between display 1310 and control circuitry 1308 such that display 1310 updates in response to inputs received via input/output circuitry 1312 (e.g., simultaneously update what is shown in display 1310 based on inputs received by generating corresponding outputs based on instructions stored in memory via a non-transitory, computer-readable medium).

Server 1304 and computing device 1302 may transmit and receive content and data such as media content via communication network 1306. For example, server 1304 may be a media content provider, and computing device 1302 may be a smart television configured to download or stream media content, such as a live news broadcast, from server 1304. Control circuitry 1334, 1308 may send and receive commands, requests, and other suitable data through communication network 1306 using communication circuitry 1332, 1326, respectively. Alternatively, control circuitry 1334, 1308 may communicate directly with each other using communication circuitry 1332, 1326, respectively, avoiding communication network 1306.

It is understood that computing device 1302 is not limited to the embodiments and methods shown and described herein. In nonlimiting examples, computing device 1302 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 1302 receives user input 1314 at input/output circuitry 1312. For example, computing device 1302 may receive a user input such as a user swipe or user touch. It is understood that computing device 1302 is not limited to the embodiments and methods shown and described herein.

User input 1314 may be received from a user selection-capturing interface that is separate from device 1302, such as a remote-control device, trackpad, or any other suitable user movement-sensitive, audio-sensitive or capture devices, or as part of device 1302, such as a touchscreen of display 1310. Transmission of user input 1314 to computing device 1302 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 1312 may include a physical input port such as a 12.5 mm (0.3346 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 1318 may receive user input 1314 from input/output circuitry 1312 using communication path 1316. Processing circuitry 1318 may convert or translate the received user input 1314 that may be in the form of audio data, visual data, gestures, or movement to digital signals. In some embodiments, input/output circuitry 1312 performs the translation to digital signals. In some embodiments, processing circuitry 1318 (or processing circuitry 1336, as the case may be) carries out disclosed processes and methods.

Processing circuitry 1318 may provide requests to storage 1322 by communication path 1320. Storage 1322 may provide requested information to processing circuitry 1318 by communication path 1346. Storage 1322 may transfer a request for information to communication circuitry 1326 which may translate or encode the request for information to a format receivable by communication network 1306 before transferring the request for information by communication path 1328. Communication network 1306 may forward the translated or encoded request for information to communication circuitry 1332, by communication path 1330.

At communication circuitry 1332, the translated or encoded request for information, received through communication path 1330, is translated or decoded for processing circuitry 1336, which will provide a response to the request for information based on information available through control circuitry 1334 or storage 1338, or a combination thereof. The response to the request for information is then provided back to communication network 1306 by communication path 1340 in an encoded or translated format such that communication network 1306 can forward the encoded or translated response back to communication circuitry 1326 by communication path 1342.

At communication circuitry 1326, the encoded or translated response to the request for information may be provided directly back to processing circuitry 1318 by communication path 1354 or may be provided to storage 1322 through communication path 1344, which then provides the information to processing circuitry 1318 by communication path 1346. Processing circuitry 1318 may also provide a request for information directly to communication circuitry 1326 through communication path 1352, where storage 1322 responds to an information request (provided through communication path 1320 or 1344) by communication path 1324 or 1346 that storage 1322 does not contain information pertaining to the request from processing circuitry 1318.

Processing circuitry 1318 may process the response to the request received through communication paths 1346 or 1354 and may provide instructions to display 1310 for a notification to be provided to the users through communication path 1348. Display 1310 may incorporate a timer for providing the notification or may rely on inputs through input/output circuitry 1312 from the user, which are forwarded through processing circuitry 1318 through communication path 1348, to determine how long or in what format to provide the notification. When display 1310 determines the display has been completed, a notification may be provided to processing circuitry 1318 through communication path 1350.

The communication paths provided in FIG. 13 between computing device 1302, server 1304, communication network 1306, and all subcomponents depicted are exemplary and may be modified to reduce processing time or enhance processing capabilities for each step in the processes disclosed herein by one skilled in the art.

Examples

As shown, for example, in FIGS. 1A and 13, a system 1, 1300 is provided for delivery of media content from a content provider to a media device (e.g., 350, 360, 370, 380, 390, 1260, 1280, 1302) through a communication system 3

(FIG. 1A), communication network 1270 (FIG. 12), communication network 1306 (FIG. 13). In some embodiments, the system 1, 1300 is configured to perform one or more methods related to control of content delivery. In one exemplary implementation, a server 2 (FIG. 1A), 1304 of a content provider delivers content to a device (e.g., 350, 360, 370, 380, 390, 1260, 1280, 1302) of a media consumer. The content is delivered directly to the device (e.g., 350, 360, 370, 380, 390, 1260, 1280, 1302) or via an intermediate system 1, 1300 such as a cloud-based system 5. The content is temporarily or permanently stored in a local storage device 17, 1322, on one or more devices (e.g., 350, 360, 370, 380, 390, 1260, 1280, 1302), and/or on the cloud-based system 5. The content is cast from one device (e.g., 350, 360, 370, 380, 390, 1260, 1280, 1302) to another device (e.g., 350, 360, 370, 380, 390, 1260, 1280, 1302). One or more content streams 7, 11, 97 from the server 2, 1304, one or more devices (e.g., 350, 360, 370, 380, 390, 1260, 1280, 1302), or the local storage device 17, 1322 is transmitted to one or more devices (e.g., 350, 360, 370, 380, 390, 1260, 1280, 1302).

In some embodiments, a user of one device (e.g., 350, 360, 370, 380, 390, 1260, 1280, 1302) initiates a request 23 for media content from a content provider server 2 (FIG. 1A). The content provider server 2 receives the request 23. The content provider server 2 receives 29 one or more of an inputted content preference, a user profile, an analysis of content consumption, and metadata of the media content item (e.g., 111, 121, 131, 141, 151, 161, 150, 160, 170, 180, 190, 1005, 1265 of FIGS. 2A-E). The inputted content preference includes, for example, user selection of one or more content preferences from a predetermined list. The content provider server 2 determines 31 a content preference based on any suitable input, for example, the content provider server 2 determines a content preference based on one or more of the inputted content preference, the user profile, the analysis of the content consumption, the metadata of the media content item (e.g., 111, 121, 131, 141, 151, 161, 150, 160, 170, 180, 190, 1005, 1265), and a predicted content preference generated, for example, by the prediction process 1200 (FIG. 12). The content preference is predicted based on one or more of the inputted content preference, the user profile, the analysis of the content consumption, and the metadata of the media content. The content provider server 2 receives 37 metadata regarding at least one of a plurality of media content streams (e.g., 111, 121, 131, 141, 151, 161, 150, 160, 170, 180, 190, 1005) determined to be related to the media content item (e.g., 111, 121, 131, 141, 151, 161, 150, 160, 170, 180, 190, 1005, 1265). The content provider server 2 determines 41 a distribution of the at least one of the plurality of media content streams (e.g., 111, 121, 131, 141, 151, 161, 150, 160, 170, 180, 190, 1005) based on the determined content preference. The content provider server 2 generates 73 for display a preferred media content stream including one or more portions of the at least one of the plurality of media content streams (e.g., 111, 121, 131, 141, 151, 161, 150, 160, 170, 180, 190, 1005) based on the distribution.

In some embodiments, for each of the plurality of media content streams (e.g., 111, 121, 131, 141, 151, 161, 150, 160, 170, 180, 190, 1005), a weighted percentage of a total running time of the media content item (e.g., 111, 121, 131, 141, 151, 161, 150, 160, 170, 180, 190, 1005, 1265) is determined 43 based on the distribution, where the total running time corresponds with 100% (see, e.g., FIGS. 7 and 8 for exemplary distributions for User 1 and User 2). In some embodiments, after the weighted percentages are determined 43, the distribution may be determined 41.

In some embodiments, in response to determining 47 that at least two of the plurality of media streams include concurrent live content (Yes at 47), one of the at least two of the plurality of media streams are generated at 53 (FIG. 1A), 1410 for display in a main display area; and a selectable option for each of the at least two of the plurality of media streams not included in the main display area is generated at 1410, 1422 for display (e.g., FIG. 1B, FIG. 14A, FIG. 14B). In some embodiments, the selectable option is superimposed at 1412 over the main display area (e.g., FIG. 1B). Upon selection of the selectable option (Yes at 67 or Yes at 1414 or Yes at 1424 or Yes at 1434), the main display area is switched at 71, 1416, 1426, 1436 to the selected one of the at least two of the plurality of media streams not previously included in the main display area (e.g., FIG. 4). In some embodiments, if concurrent live content is not detected (No at 47), the preferred media content stream is generated at 73 (FIG. 1A) with available content. If no selection of the selectable option is performed (No at 67 or No at 1414 or No at 1424 or No at 1434), the main display area maintains the current display.

As shown, for example, in FIGS. 1A and 14B, in some embodiments, in response to determining at 47 that at least two of the plurality of media streams include concurrent live content (Yes at 47), a grid (e.g., FIGS. 2A to 2E) is generated at 53, 1420 for display. The grid (e.g., FIG. 2A, FIG. 2B, FIG. 2C, FIG. 2D, FIG. 2E) includes a plurality of display sections (e.g., 150, 160, 170, 180 or 111, 121, 131, 141, 151, 161). In some embodiments (e.g., FIG. 1B, FIG. 2A, FIG. 2B), each of the plurality of display sections includes one of the at least two of the plurality of media streams determined to include concurrent live content. In other embodiments, a mixture of live and pre-recorded or previously broadcast content may be displayed (e.g., FIGS. 2C, 2D, 2E).

As shown, for example, in FIG. 14C, in some embodiments, in response to determining at 47 that at least two of the plurality of media streams include concurrent live content (Yes at 47), at least one of the two of the plurality of media streams is generated at 1430 for display including concurrent live content in a first display area (e.g., 150 of FIG. 1B, 150 of FIG. 2A, or 111 of FIG. 2B). Another of the at least two of the plurality of media streams is generated at 1432 for display including concurrent live content in a second display area (e.g., 160 of FIG. 1B, 160 of FIG. 2A, or 121 of FIG. 2B).

As shown, for example, in FIGS. 3A to 3E, and FIG. 14D, in some embodiments, the preferred media content stream is displayed on a main display (e.g., 350). In response to determining at 47 that at least two of the plurality of media streams include concurrent live content (Yes at 47), and in response to determining at 59, 1440 that at least one additional display is available (Yes at 59 or Yes at 1440), one of the at least two of the plurality of media streams including concurrent live content is generated at 1442 for display on the main display (e.g., 350). Another of the at least two of the plurality of media streams is generated at 1444 for display including concurrent live content on the at least one additional display (e.g., 360, 370, 380, 390) determined to be available. In some embodiments, in response to determining at 59 that at least one additional display is not available (No at 59 or No at 1440), the preferred media content stream is generated at 73 for one or more available displays.

As shown, for example, in FIG. 14E, in some embodiments, in response to determining at 47 that at least two of the plurality of media streams include concurrent live content (Yes at 47) and in response to determining 1450 a content overlap (Yes at 1450) (see also, e.g., examples of overlapping streams in FIG. 11, $t_1$-$t_2$, $t_3$-$t_4$, $t_5$-$t_6$, $t_9$-$t_{10}$, and $t_{11}$ . . . ), a priority for each of the at least two of the plurality of media streams is determined 1452 based on the distribution. A highest priority media stream is determined 1454 based on the determined priority. The highest priority media stream is included 1454 in the preferred media content stream during the overlap. Non-preferred media stream(s) are excluded 1456 from the preferred media content stream during the overlap. In some embodiments, in response to determining 1450 no content overlap (No at 1450) (see also, e.g., a non-overlapping stream 1115 at time $t_7$ to time $t_8$ in FIG. 11), the display is generated 73 (FIG. 14A) with the available stream.

As shown, for example, in FIG. 14F, in some embodiments, in response to determining 47 that at least two of the plurality of media streams include concurrent live content (Yes at 47) and in response to determining 1460 a content overlap for a first period of time (Yes at 1460), a priority is determined 1462 for each of the at least two of the plurality of media streams based on the distribution. A highest priority media stream is determined 1464 based on the determined priority. A second highest priority media stream is determined 1466 based on the determined priority. The highest priority media stream is included 1468 in the preferred media content stream during the overlap for the first period of time. Non-preferred media stream(s) are excluded 1470 from the preferred media content stream during the overlap for the first period of time. In response to determining 1472 that at least two of the plurality of media streams contain concurrent live content and overlap for a second period of time (Yes at 1472), the second highest priority media stream is included 1474 in the preferred media content stream during the overlap for the second period of time. The highest priority stream and the non-preferred media stream(s) are excluded 1476 from the preferred media content stream during the overlap for the second period of time.

As shown, for example, in FIG. 14G, in some embodiments, in response to determining 1482 that only one of the plurality of media streams contains concurrent live content (Yes at 1482), the only one of the plurality of media streams is included 1484 in the preferred media content stream (No at 1486) until detecting 1486 that another of the plurality of media streams contains concurrent live content (Yes at 1486). In some embodiments, in response to determining 1482 that more than one of the plurality of media streams contains concurrent live content (No at 1482), further analysis is performed, e.g., priority analysis (e.g., FIGS. 14E and 14F) to determine the content for display generation.

In some embodiments, the media content item (e.g., 111, 121, 131, 141, 151, 161; 150, 160, 170, 180, 190 in FIGS. 1B, 2A, 3A to 3E, 4; 1005 in FIG. 10; 1265) includes audiovisual content of a live event. In some embodiments, the live event is one of a sports event (e.g., FIGS. 1B and 2A, 111 of FIGS. 2B, 2C, and 2D, FIGS. 3A to 3E, FIG. 4, and FIG. 10), a reality show (e.g., 121 of FIG. 2B), a weather report (e.g., 131 of FIG. 2B), a political event (e.g., 141 of FIG. 2B), a stock market report (e.g., 151 of FIG. 2B), and a news report (e.g., 161 of FIG. 2B).

In some embodiments, the plurality of media content streams (e.g., 111, 121, 131, 141, 151, 161, 150, 160, 170, 180, 190, 1005) includes at least one or all of a main stream (e.g., 150), a statistics stream (e.g., 160), an expert panel stream (e.g., 170), a crowd stream (e.g., 180), an interview stream (e.g., 190), a previous event stream (e.g., 121, 131, 141, 151, 161 of FIGS. 2C and 2D, and 111, 121, 131, 141, 151, 161 of FIG. 2E), a user-generated content stream, and an advertising stream.

As shown, for example, in FIGS. 1A, 13, and 15, in some embodiments, a system 1, 1300 is provided to increase viewership of and interest in content including live events, sporting events, and reality shows. The system 1, 1300 performs a process 1500. A profile of a user is accessed 1505. An interest level of a user is determined 1510 based on analysis of the accessed profile. A primary content stream is generated 1515 for display including display of the content item. A subject related to a content item is determined 1520. A likelihood the subject related to the content item displayed in the primary content stream is of interest to the user is determined 1530 based on the determined interest level of the user based on the analysis of the accessed profile. In response to the determining 1535 the likelihood satisfies a predetermined condition (Yes at 1535), secondary content is retrieved 1555, and a secondary content stream is generated 1560 for display including display of supplemental content (e.g., FIGS. 1B, 2A to 2E, 3A to 3E, 4) including at least the subject related to the content item. In some embodiments, a determination 1550 of greater user interest in primary content or secondary content is performed. In some embodiments, in response to a determination 1550 is of greater user interest in primary content (Primary at 1550), the primary content stream is generated 1515 for display including display of the content item. In some embodiments, in response to a determination 1550 of greater user interest in secondary content (Secondary at 1550), the process 1500 proceeds with the analysis 1545 of data including one or more of user preferences, the accessed profile, metadata of the content item, and a viewing history of the user.

In some embodiments, the generating for display includes displaying 1565, 1570, 1575 the secondary content stream on one or more of a full screen (e.g., FIGS. 1B, 4, 10) of a client device (e.g., 350, 360, 370, 380, 390, 1260, 1280, 1302), a picture-in-picture screen (e.g., FIG. 1B) of the client device (e.g., 350, 360, 370, 380, 390, 1260, 1280, 1302), a grid display (e.g., FIGS. 2A, 2B, 2C, 2D, 2E) on the client device (e.g., 350, 360, 370, 380, 390, 1260, 1280, 1302), and a second client device (e.g., 350, 360, 370, 380, 390, 1260, 1280, 1302). The secondary content stream includes one or more of pre-event content, interval content, halftime show content, post-event content, live content, pre-recorded content, a pre-packaged information segment, statistics content, an expert panel discussion, a view of a crowd, a view of a gathering, an interview with a subject of the live event. The generating for display includes automatically switching between the primary content stream and the secondary content stream based on an analysis 1545 of data including one or more of user preferences, the accessed profile, metadata of the content item, and a viewing history of the user.

In some embodiments, a client device (e.g., 350, 360, 370, 380, 390, 1260, 1280, 1302) performs one or more of the accessing, the determining of the interest level, the generating for display of the primary content stream, the determining of the subject, the determining of the likelihood, and the generating for display the secondary content stream. A server-side device 2, 1304 performs one or more of the accessing, the determining of the interest level, the generating for display of the primary content stream, the determining of the subject, the determining of the likelihood, and the generating for display of the secondary content stream.

In some embodiments, the primary content stream is a continuous stream (e.g., 1135). In some embodiments, the primary content stream is prepared by an editor at the server-side device 2, 1304. The primary content stream includes one or more of a segment type playing state, an open-ended playing state, and a discontinuous playing state.

In some embodiments, the secondary content stream is a stream of a predetermined type. The secondary content stream is available for display when the type of content is available live and being recorded and/or transmitted. The secondary content stream is one or more secondary content streams including a user-generated content (UGC) stream, a statistics stream, an expert panel stream, a crowd stream, and an interview stream.

In some embodiments, metadata is associated 1525 with the content item. The metadata includes one or more of a content identifier, a title, a duration, and a playlist field (see Table 1). The playlist field includes a playlist type, and a uniform resource locator (URL) for each playlist type. Each URL includes one or more of a protocol, a subdomain, a domain name, a top-level domain, a folder name, a playlist type, a playlist filename, and a playlist file extension. The playlist type corresponds to the primary content stream or the subject of the secondary content stream. The playlist file extension is m3u8.

In some embodiments, the primary content stream is provided in a primary mode without the secondary content stream (e.g., FIG. 10). In other embodiments, the primary content stream is provided in a secondary mode with the secondary content stream on a single screen. The secondary content stream can be provided as part of a user interface (e.g., FIGS. 1B, 2A, 2B, 2C, 2D, 2E). The user interface is configured with one or more user-selectable options corresponding to one or more secondary content streams.

In some embodiments, in response to selection of one of the one or more secondary content streams, the selected secondary content stream replaces the primary content stream (e.g., FIG. 4). In response to selection of one of the one or more secondary content streams, the selected secondary content stream is presented in a primary position, and the primary content stream is presented in a secondary position. The secondary content stream is determined 1540 to be available until, for example, an EXT-X-DISCONTINUITY tag is received. In response to the receipt of the EXT-X-DISCONTINUITY tag (No at 1540), display of the secondary content stream is automatically replaced with the primary content stream 1515. In response to the receipt of the EXT-X-DISCONTINUITY tag, availability of another secondary content stream is determined 1540. If another secondary content stream is available (Yes at 1540), display of the secondary content stream is automatically replaced with another secondary content stream 1560.

In some embodiments, the user profile includes information of viewing history based on content type or segment type. The secondary content stream includes content filtered by segment type.

In some embodiments, content is filtered based on a determination of a preference of the user for each segment type. Content is filtered based on a determination of a preference for content of each segment type to be played on a client device (e.g., 350, 360, 370, 380, 390, 1260, 1280, 1302). A rank of each of the filtered segment types is based on metadata. The metadata is based on the user profile.

In some embodiments, the secondary content stream includes a plurality of secondary content streams ranked based on the metadata based on the user profile. An availability of a top-ranked secondary content stream is determined. The top-ranked secondary content stream is displayed if available until a contrary signal is transmitted. If the top-ranked secondary content stream is not available, then the primary content stream is displayed. The contrary signal is an EXT-X-DISCONTINUITY tag. In response to receiving the EXT-X-DISCONTINUITY tag, an availability of a second highest ranked secondary content stream is determined. The second highest ranked secondary content stream is displayed if available. If the second highest ranked secondary content stream is not available, then the primary content stream is displayed. The secondary content stream is selected for display based on an availability of content. The primary content stream is presented as a default unless the secondary content stream satisfies a predetermined standard.

In some embodiments, display of the secondary content stream is based on noise in decibels received from a decibel meter meeting or exceeding a predetermined number of decibels. Display of the secondary content stream is based on a motion analysis system. The motion analysis system is trained to identify motion indicative of a score in a sporting event.

In some embodiments, a percentage and/or a duration of a segment type for display as the secondary content stream is determined. The percentage and/or the duration of the segment type is calculated based on the profile of the user and a viewing history of the user. The primary content stream is the same for all users. The primary content stream includes a static, predetermined proportion of content by content type. The secondary content stream includes a dynamic proportion of content by content type. The dynamic proportion of the content by the content type is based on the profile of the user or a viewing history of the user. The dynamic proportion of the content by the content type is based on one or more of viewing times of the content types of the content, received input from the user indicating preferences for content types of the content, and an analysis of user profiles determined to be likely to be similar to the profile of the user. The primary content stream includes a targeted primary content feed based on a determined cluster of viewers having common attributes. The cluster is determined based on machine learning techniques. The targeted primary content feed is edited by an editor. The secondary content stream includes content uploaded from a video-sharing platform or a social media platform.

In some embodiments, supplemental content is displayed in the secondary content stream in response to a signal indicating a score, or a notable event. The score or the notable event is detected based on analysis of one or more of on-screen information, object analysis, audio analysis, entry of a signal, and monitoring of social media. The secondary content stream includes content based on a location or a geographic area. The secondary content stream includes content from a scored source. The score is higher if from a verified user and lower for an unverified user. The secondary content stream includes content generated by a verified user or a verified expert in each topic.

In some embodiments, advertisements playing on the primary content stream are the same as or different than advertisements playing on the secondary content stream. The advertisements playing on the secondary content stream are targeted to the user.

In some embodiments, an availability of the secondary content stream is dependent on one or more of entitlement or licensing rights associated with the content item. An electronic program guide is updated to include information regarding the secondary content stream. The content of the secondary content stream is made available on-demand for at least a period after the live broadcast. The on-demand content is chaptered.

In some embodiments, identification of an event of interest is included in the primary content stream. The secondary content stream is based on the identified event of interest in the primary content stream.

In some embodiments, the primary content stream is a stream of a sporting event. The event of interest is one or more of, in football, an interception, a one-handed catch, a legal trick play, a two-point conversion, a Hail Mary, a last second field goal; in baseball, a perfect game, a no hitter, a double play, a triple play, a stolen base, a walk-off home run; in hockey, a hat trick, a short-handed goal, a power play goal; in basketball, a slam dunk, a buzzer beater; in soccer, a bicycle kick, a penalty kick; in golf, a hole-in-one, an eagle; in bowling, a three-hundred score, conversion of a 7-10 split, a perfect score in a scored sport, a perfect 10 in gymnastics, a record-breaking performance in a sport, a photo finish, a winning play or score as time runs out, and the like.

In some embodiments, the primary content stream is a stream of a reality show. The event of interest is one or more of formation of an alliance, designation of a leadership position, association of a contestant with an event of negative consequence, and association of a contestant with an event of positive consequence.

In some embodiments, the primary content stream is a stream of one or more of weather reporting, a political event, an election results show, stock market reporting, general news reporting, and breaking news reporting. The secondary content stream is the stream of the election results show. The secondary content stream includes display of video including one or more of past speeches by a candidate, statistics about the election, polling leading up to the election, maps and charts relating to the statistics and the polling, exit polling, expert analysis, a live stream from a location of interest, reactions from individuals or viewer groups, and a live stream of a crowd.

A system 1, 1300 is provided including control circuitry configured for performing one or more functions noted above. A device (e.g., 350, 360, 370, 380, 390, 1260, 1280, 1302) is provided including means for performing one or more functions noted above. One or more non-transitory, computer-readable media having non-transitory, computer-readable instructions encoded thereon are provided. The instructions, when executed by control circuitry, cause the control circuitry to perform one or more functions noted above. One or more methods for performing one or more of the functions noted herein are provided. The techniques and approaches disclosed herein address and overcome the problems of prior approaches.

Definitions

The terminology used herein is for the purpose of describing embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes all combinations of one or more of the associated listed items.

Although at least one exemplary embodiment is described as using a plurality of units to perform the exemplary process, it is understood that the exemplary processes may also be performed by one or a plurality of modules. Additionally, it is understood that the term controller/control unit may refer to a hardware device that includes a memory and a processor. The memory may be configured to store the modules, and the processor may be specifically configured to execute said modules to perform one or more processes, which are described further below.

The use of the terms "first," "second," "third," and so on, herein, are provided to identify structures or operations, without describing an order of structures or operations, and, to the extent the structures or operations are used in an exemplary embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed. More generally, the disclosure herein is meant to be exemplary and not limiting. Only the claims that follow are meant to set bounds as to what the present disclosure includes. Furthermore, it should be noted that the features and limitations described in any one exemplary embodiment may be applied to any other exemplary embodiment herein, and flowcharts or examples relating to one exemplary embodiment may be combined with any other exemplary embodiment in a suitable manner, done in different orders, or done in parallel. In addition, the methods and systems described herein may be performed in real time. It should also be noted that the systems and/or methods described herein may be applied to, or used in accordance with, other systems and/or methods.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving metadata regarding at least one of a plurality of media content streams related to a media content item;
determining a content preference based on the metadata;

determining a distribution of the at least one of the plurality of media content streams based on the determined content preference and by determining, for each of the plurality of media content streams, a portion of a total running time of the media content item based on the determined content preference, wherein the portion is a weighted percentage of the total running time of the media content item, and wherein the total running time corresponds with 100%; and generating for display a preferred media content stream including one or more portions of the at least one of the plurality of media content streams based on the distribution.

2. The method of claim 1, further comprising:
receiving a request for the media content item;
receiving at least one of:
 an inputted content preference;
 a user profile; or
 an analysis of content consumption,
wherein the determining of the content preference is based on at least one of:
 the inputted content preference;
 the user profile;
 the analysis of the content consumption;
 the metadata; or
 a predicted content preference based on at least one of the inputted content preference, the user profile, the analysis of the content consumption, or the metadata of the media content.

3. The method of claim 1, further comprising:
in response to determining that at least two of the plurality of media streams include concurrent live content:
 generating for display one of the at least two of the plurality of media streams in a main display area; and
 generating for display superimposed over the main display area a selectable option for each of the at least two of the plurality of media streams not included in the main display area, wherein, upon selection of the selectable option, the main display area is switched to the selected one of the at least two of the plurality of media streams not previously included in the main display area.

4. The method of claim 1, further comprising:
in response to determining that at least two of the plurality of media streams include concurrent live content:
 generating for display a grid, wherein the grid comprises a plurality of display sections, wherein each of the plurality of display sections includes one of the at least two of the plurality of media streams determined to include the concurrent live content.

5. The method of claim 1, further comprising:
in response to determining that at least two of the plurality of media streams include concurrent live content:
 generating for display at least one of the two of the plurality of media streams including the concurrent live content in a first display area; and
 generating for display another of the at least two of the plurality of media streams including the concurrent live content in a second display area.

6. The method of claim 1, further comprising:
displaying the preferred media content stream on a main display;
in response to determining that at least two of the plurality of media streams include concurrent live content, and in response to determining that at least one additional display is available:
 generating for display one of the at least two of the plurality of media streams including the concurrent live content on the main display; and
 generating for display another of the at least two of the plurality of media streams including the concurrent live content on the at least one additional display determined to be available.

7. The method of claim 1, further comprising:
in response to determining that at least two of the plurality of media streams include concurrent live content and overlap, determining a priority for each of the at least two of the plurality of media streams based on the distribution;
determining a highest priority media stream based on the determined priority;
including the highest priority media stream in the preferred media content stream during the overlap; and
excluding at least one non-preferred media stream from the preferred media content stream during the overlap.

8. The method of claim 1, further comprising:
in response to determining that at least two of the plurality of media streams include concurrent live content and overlap for a first period of time, determining a priority for each of the at least two of the plurality of media streams based on the distribution;
determining a highest priority media stream based on the determined priority;
determining a second highest priority media stream based on the determined priority;
including the highest priority media stream in the preferred media content stream during the overlap for the first period of time;
excluding at least one non-preferred media stream from the preferred media content stream during the overlap for the first period of time;
in response to determining that at least two of the plurality of media streams contain the concurrent live content and the overlap for a second period of time, including the second highest priority media stream in the preferred media content stream during the overlap for the second period of time; and
excluding the highest priority media stream and the at least one non-preferred media stream from the preferred media content stream during the overlap for the second period of time.

9. A method comprising:
receiving metadata regarding at least one of a plurality of media content streams related to a media content item;
determining a content preference based on the metadata;
determining a distribution of the at least one of the plurality of media content streams based on the determined content preference;
generating for display a preferred media content stream including one or more portions of the at least one of the plurality of media content streams based on the distribution; and
in response to determining that only one of the plurality of media streams contains live content, including the only one of the plurality of media streams in the preferred media content stream until detecting that another of the plurality of media streams contains concurrent live content.

10. The method of claim 1, wherein the media content item includes audiovisual content of a live event, and wherein the live event is one of a sports event, a reality show, a weather report, a political event, a stock market report, and a news report.

11. The method of claim 1, wherein the plurality of media content streams includes at least one or all of a main stream, a statistics stream, an expert panel stream, a crowd stream, an interview stream, a previous event stream, a user-generated content stream, and an advertising stream.

12. A method to increase viewership of and interest in content including one or more live events, sporting events, and reality shows, the method comprising:
 accessing a profile of a user;
 determining an interest level of the user in the content based on analysis of the accessed profile;
 generating for display a primary content stream including display of a content item;
 determining a subject related to the content item;
 determining a likelihood the subject related to the content item is of interest to the user based on the determined interest level of the use; and
 in response to the determining the likelihood satisfies a predetermined condition, generating for display a secondary content stream including display of supplemental content including the subject related to the content item, wherein the secondary content stream is a stream of a predetermined type, and the secondary content stream is only available for display when the predetermined type of the secondary content stream is available live and being recorded and/or transmitted.

13. The method of claim 12, wherein the generating for display the secondary content stream includes displaying the secondary content stream on at least one of a full screen of a client device, a picture-in-picture screen of the client device, a grid display on the client device, or a second client device.

14. The method of claim 12, wherein the secondary content stream includes at least one of pre-event content, interval content, halftime show content, post-event content, live content, pre-recorded content, a pre-packaged information segment, statistics content, an expert panel discussion, a view of a crowd, a view of a gathering, or an interview with a subject of the one or more live events.

15. The method of claim 12, wherein the determining of the interest level of the user includes analyzing of data including at least one of user preferences, the accessed profile, metadata of the content item, and a viewing history of the user, wherein the method further includes determining whether the user is more interested in the primary content stream or the secondary content stream based on the determined interest level; or automatically switching between the primary content stream and the secondary content stream based on the analyzing.

16. The method of claim 12, wherein the secondary content stream is one or more secondary content streams including a user-generated content (UGC) stream, a statistics stream, an expert panel stream, a crowd stream, and an interview stream.

17. The method of claim 12, the method including identification of an event of interest in the primary content stream, wherein the primary content stream is a stream of a reality show, and the event of interest is at least one of: formation of an alliance, designation of a leadership position, association of a contestant with an event of negative consequence, or association of a contestant with an event of positive consequence.

18. The method of claim 12, the method including identification of an event of interest in the primary content stream, wherein the primary content stream is a stream of at least one of: weather reporting, a political event, an election results show, stock market reporting, general news reporting, or breaking news reporting.

19. A system comprising:
 input circuitry configured to:
  receive metadata regarding at least one of a plurality of media content streams related to a media content item; and
 control circuitry configured to:
  determine a content preference based on the metadata;
  determine a distribution of the at least one of the plurality of media content streams based on the determined content preference and by determining, for each of the plurality of media content streams, a portion of a total running time of the media content item based on the determined content preference, wherein the portion is a weighted percentage of the total running time of the media content item, and wherein the total running time corresponds with 100%; and
  generate for display a preferred media content stream including one or more portions of the at least one of the plurality of media content streams based on the distribution.

20. A system comprising:
 input circuitry configured to:
  receive metadata regarding at least one of a plurality of media content streams related to a media content item; and
 control circuitry configured to:
  determine a content preference based on the metadata;
  determine a distribution of the at least one of the plurality of media content streams based on the determined content preference;
  generate for display a preferred media content stream including one or more portions of the at least one of the plurality of media content streams based on the distribution; and
  in response to determining that only one of the plurality of media streams contains live content, include the only one of the plurality of media streams in the preferred media content stream until detecting that another of the plurality of media streams contains concurrent live content.

21. A system to increase viewership of and interest in content including live events, sporting events, and reality shows, the system comprising:
 input circuitry configured to:
  accessing a profile of a user; and
 control circuitry configured to:
  determine an interest level of the user in the content based on analysis of the accessed profile;
  generate for display a primary content stream including display of the content item;
  determine a subject related to the content item;
  determine a likelihood the subject related to the content item is of interest to the user based on the determined interest level of the user; and
  in response to the determining the likelihood satisfies a predetermined condition, generate for display a secondary content stream including display of supplemental content including the subject related to the content item, wherein the secondary content stream is a stream of a predetermined type, and the secondary content stream is only available for display when the predetermined type of the secondary content stream is available live and being recorded and/or transmitted.

\* \* \* \* \*